US012603737B2

(12) United States Patent
Yu et al.

(10) Patent No.: US 12,603,737 B2
(45) Date of Patent: Apr. 14, 2026

(54) PPDU TRANSMISSION METHOD AND RELATED APPARATUS

(71) Applicant: Huawei Technologies Co., Ltd., Shenzhen (CN)

(72) Inventors: Jian Yu, Shenzhen (CN); Mengshi Hu, Shenzhen (CN); Shimon Shilo, Hod Hasharon (IL); Jinzhe Pan, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 282 days.

(21) Appl. No.: 18/345,733

(22) Filed: Jun. 30, 2023

(65) Prior Publication Data

US 2023/0344586 A1      Oct. 26, 2023

Related U.S. Application Data

(63) Continuation of application No. PCT/CN2021/123193, filed on Oct. 12, 2021.

(30) Foreign Application Priority Data

Jan. 4, 2021      (CN) .......................... 202110005010.4

(51) Int. Cl.
H04W 72/04 (2023.01)
H04L 5/00 (2006.01)
(Continued)

(52) U.S. Cl.
CPC ............ H04L 5/0048 (2013.01); H04L 69/06 (2013.01)

(58) Field of Classification Search
None
See application file for complete search history.

(56) References Cited

U.S. PATENT DOCUMENTS

| 2019/0013978 A1 | 1/2019 | Zhou et al. | |
| 2021/0050952 A1* | 2/2021 | Noh | ........................ H04L 1/189 |
| 2022/0330344 A1* | 10/2022 | Lou | ........................ H04L 5/0055 |

FOREIGN PATENT DOCUMENTS

| CN | 108737054 A | 11/2018 |
| CN | 109218243 A | 1/2019 |

(Continued)

OTHER PUBLICATIONS

Hongyuan Zhang et al., "Doppler Comment Resolution," IEEE P802.11, Sep. 12, 2017, 16 pages.
(Continued)

*Primary Examiner* — Maharishi V Khirodhar
(74) *Attorney, Agent, or Firm* — Slater Matsil, LLP

(57) ABSTRACT

A method includes: generating a physical layer protocol data unit PPDU, where the PPDU includes a data field; and sending the PPDU to a first station and a second station, where the first station is a station that does not support receiving a midamble, and the second station is a station that supports receiving the midamble. A second data field transmitted on a second resource unit allocated to the second station includes a midamble subfield. A first data field transmitted on a first resource unit allocated to the first station includes a useful information subfield. The useful information subfield includes useful data information, and the useful information subfield is located before a first OFDM symbol corresponding to the midamble subfield.

17 Claims, 18 Drawing Sheets

(51) Int. Cl.
    *H04L 69/06*         (2022.01)
    *H04W 76/00*       (2018.01)
    *H04W 88/08*       (2009.01)

(56)              References Cited

FOREIGN PATENT DOCUMENTS

| | | | |
|---|---|---|---|
| CN | 109964442 A | 7/2019 | |
| CN | 109428704 A | 7/2021 | |
| CN | 110572238 A | 3/2022 | |
| WO | WO-2020226457 A1 * | 11/2020 | ............... H04L 5/00 |

OTHER PUBLICATIONS

IEEE P802.11ax/D8.0, "Draft Standard for Information technology—Telecommunications and information exchange between systems Local and metropolitan area networks—Specific requirements," Part 11: Wireless LAN Medium Access Control (MAC) and Physical Layer (PHY) Specifications: Amendment 1: Enhancements for High Efficiency WLAN, Oct. 2020, 820 pages.

* cited by examiner

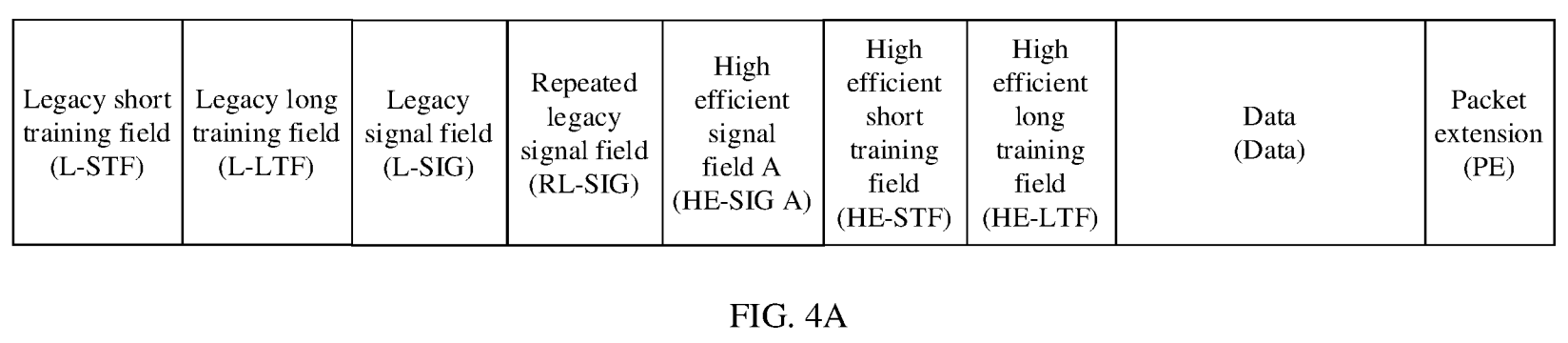

| Legacy short training field (L-STF) | Legacy long training field (L-LTF) | Legacy signal field (L-SIG) | Repeated legacy signal field (RL-SIG) | High efficient signal field A (HE-SIG A) | High efficient short training field (HE-STF) | High efficient long training field (HE-LTF) | Data (Data) | Packet extension (PE) |
|---|---|---|---|---|---|---|---|---|

FIG. 4A

| | |
|---|---|
| PE | |
| Data (STA 1) | |
| Midamble (HE-LTF) | |
| Data (STA 1) | |
| Midamble (HE-LTF) | |
| Data (STA 1) | |
| HE-LTF | |
| HE-STF | |
| HE-SIG A | |
| RL-SIG | |
| L-SIG | |
| L-LTF | |
| L-STF | |

FIG. 4B

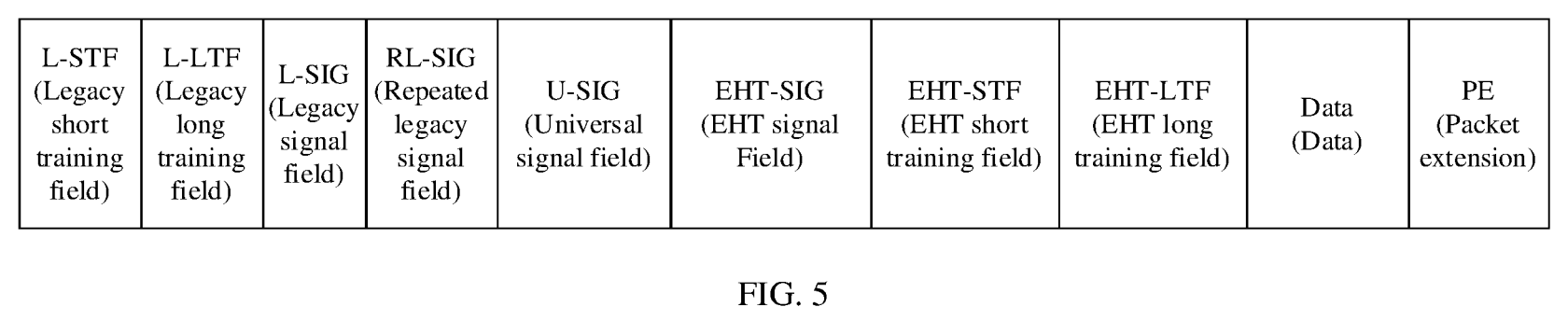

| L-STF (Legacy short training field) | L-LTF (Legacy long training field) | L-SIG (Legacy signal field) | RL-SIG (Repeated legacy signal field) | U-SIG (Universal signal field) | EHT-SIG (EHT signal Field) | EHT-STF (EHT short training field) | EHT-LTF (EHT long training field) | Data (Data) | PE (Packet extension) |
|---|---|---|---|---|---|---|---|---|---|

FIG. 5

| PE | PE | PE | PE |
|---|---|---|---|
| ... | ... | ... | ... |
| Padding | Midamble | Midamble | Midamble-HE |
| Padding | Data-R2 | Data-R2 | Data-HE |
| Padding | Midamble | Midamble | Midamble-HE |
| Data-R1 | Data-R2 | Data-R2 | Data-HE |
| EHT-LTF | EHT-LTF | EHT-LTF | HE-LTF |
| EHT-STF | EHT-STF | EHT-STF | HE-STF |
| EHT-SIG | EHT-SIG | EHT-SIG | HE-SIG-B |
| U-SIG | U-SIG | U-SIG | HE-SIG-A |
| RL-SIG | RL-SIG | RL-SIG | RL-SIG |
| L-SIG | L-SIG | L-SIG | L-SIG |
| L-LTF | L-LTF | L-LTF | L-LTF |
| L-STF | L-STF | L-STF | L-STF |
| PPDU transmitted on a first resource unit | PPDU transmitted on a second resource unit | PPDU transmitted on a third resource unit | PPDU transmitted on a fourth resource unit |

FIG. 8A

| PE | PE | PE | PE |
|---|---|---|---|
| ... | ... | ... | ... |
| Midamble | Midamble | Midamble | Midamble-HE |
| Padding | Data-R2 | Data-R2 | Data-HE |
| Midamble | Midamble | Midamble | Midamble-HE |
| Data-R1 | Data-R2 | Data-R2 | Data-HE |
| EHT-LTF | EHT-LTF | EHT-LTF | HE-LTF |
| EHT-STF | EHT-STF | EHT-STF | HE-STF |
| EHT-SIG | EHT-SIG | EHT-SIG | HE-SIG-B |
| U-SIG | U-SIG | U-SIG | HE-SIG-A |
| RL-SIG | RL-SIG | RL-SIG | RL-SIG |
| L-SIG | L-SIG | L-SIG | L-SIG |
| L-LTF | L-LTF | L-LTF | L-LTF |
| L-STF | L-STF | L-STF | L-STF |
| PPDU transmitted on a first resource unit | PPDU transmitted on a second resource unit | PPDU transmitted on a third resource unit | PPDU transmitted on a fourth resource unit |

FIG. 8B

| PE | PE | PE | PE |
|---|---|---|---|
| ... | ... | ... | ... |
| Data-R1 | Midamble | Midamble | Midamble-HE |
|  | Data-R2 | Data-R2 | Data-HE |
|  | Midamble | Midamble | Midamble-HE |
|  | Data-R2 | Data-R2 | Data-HE |
| EHT-LTF | EHT-LTF | EHT-LTF | HE-LTF |
| EHT-STF | EHT-STF | EHT-STF | HE-STF |
| EHT-SIG | EHT-SIG | EHT-SIG | HE-SIG-B |
| U-SIG | U-SIG | U-SIG | HE-SIG-A |
| RL-SIG | RL-SIG | RL-SIG | RL-SIG |
| L-SIG | L-SIG | L-SIG | L-SIG |
| L-LTF | L-LTF | L-LTF | L-LTF |
| L-STF | L-STF | L-STF | L-STF |
| PPDU transmitted on a first resource unit | PPDU transmitted on a second resource unit | PPDU transmitted on a third resource unit | PPDU transmitted on a fourth resource unit |

FIG. 8C

| PE | PE | PE | PE |
|---|---|---|---|
| ... | ... | ... | ... |
| Padding | Midamble | Midamble | Midamble-HE |
| Padding | Data-R2 with support w/ support | Data-R2 with support w/ support | Data-HE |
| Padding | Midamble | Midamble | Midamble-HE |
| Data-R2 without support w/o support | Data-R2 with support w/ support | Data-R2 with support w/ support | Data-HE |
| EHT-LTF | EHT-LTF | EHT-LTF | HE-LTF |
| EHT-STF | EHT-STF | EHT-STF | HE-STF |
| EHT-SIG | EHT-SIG | EHT-SIG | HE-SIG-B |
| U-SIG | U-SIG | U-SIG | HE-SIG-A |
| RL-SIG | RL-SIG | RL-SIG | RL-SIG |
| L-SIG | L-SIG | L-SIG | L-SIG |
| L-LTF | L-LTF | L-LTF | L-LTF |
| L-STF | L-STF | L-STF | L-STF |
| PPDU transmitted on a first resource unit | PPDU transmitted on a second resource unit | PPDU transmitted on a third resource unit | PPDU transmitted on a fourth resource unit |

FIG. 9A

| PE | PE | PE | PE |
|---|---|---|---|
| ... | ... | ... | ... |
| Midamble | Midamble | Midamble | Midamble-HE |
| Padding | Data-R2 with support w/ support | Data-R2 with support w/ support | Data-HE |
| Midamble | Midamble | Midamble | Midamble-HE |
| Data-R2 without support w/o support | Data-R2 with support w/ support | Data-R2 with support w/ support | Data-HE |
| EHT-LTF | EHT-LTF | EHT-LTF | HE-LTF |
| EHT-STF | EHT-STF | EHT-STF | HE-STF |
| EHT-SIG | EHT-SIG | EHT-SIG | HE-SIG-B |
| U-SIG | U-SIG | U-SIG | HE-SIG-A |
| RL-SIG | RL-SIG | RL-SIG | RL-SIG |
| L-SIG | L-SIG | L-SIG | L-SIG |
| L-LTF | L-LTF | L-LTF | L-LTF |
| L-STF | L-STF | L-STF | L-STF |
| PPDU transmitted on a first resource unit | PPDU transmitted on a second resource unit | PPDU transmitted on a third resource unit | PPDU transmitted on a fourth resource unit |

FIG. 9B

| PE | PE | PE | PE |
|---|---|---|---|
| ... | ... | ... | ... |
| Data-R2 with support w/o support | Midamble | Midamble | Midamble-HE |
| | Data-R2 with support w/ support | Data-R2 with support w/ support | Data-HE |
| | Midamble | Midamble | Midamble-HE |
| | Data-R2 with support w/ support | Data-R2 with support w/ support | Data-HE |
| EHT-LTF | EHT-LTF | EHT-LTF | HE-LTF |
| EHT-STF | EHT-STF | EHT-STF | HE-STF |
| EHT-SIG | EHT-SIG | EHT-SIG | HE-SIG-B |
| U-SIG | U-SIG | U-SIG | HE-SIG-A |
| RL-SIG | RL-SIG | RL-SIG | RL-SIG |
| L-SIG | L-SIG | L-SIG | L-SIG |
| L-LTF | L-LTF | L-LTF | L-LTF |
| L-STF | L-STF | L-STF | L-STF |
| PPDU transmitted on a first resource unit | PPDU transmitted on a second resource unit | PPDU transmitted on a third resource unit | PPDU transmitted on a fourth resource unit |

FIG. 9C

PPDU TRANSMISSION METHOD AND RELATED APPARATUS

CROSS-REFERENCE TO RELATED APPLICATIONS

This application is a continuation of International Application No. PCT/CN2021/123193, filed on Oct. 12, 2021, which claims priority to Chinese Patent Application No. 202110005010.4, filed on Jan. 4, 2021. The disclosures of the aforementioned applications are hereby incorporated by reference in their entireties.

TECHNICAL FIELD

This application relates to the field of wireless local area network technologies, and in particular, to a PPDU transmission method and a related apparatus.

BACKGROUND

A physical layer protocol data unit (PPDU) proposed in the 802.11ax standard includes a legacy preamble (L-Preamble) field, a high efficient signal field A (HE-SIG-A), a high efficient signal field B (HE-SIG-B), a high efficient short training field (HE-STF), a high efficient long training field (HE-LTF), and a data field. The HE-SIG-A and the HE-SIG-B indicate signaling information required for demodulating a subsequent data field. The HE-STF is used to perform automatic gain control (AGC) in a multiple-input multiple-output (MIMO) case, and the HE-LTF is used by a receive end of the PPDU to measure channels on a plurality of space-time streams.

A scenario generally considered in a WLAN (wireless local area network) system is a relatively static scenario, to be specific, it is assumed that a channel does not change significantly in a specific period of time. Therefore, after the receive end of the PPDU estimates channel state information of the HE-LTF field, it is assumed that channel state information of the subsequent data field is the same as the channel state information of the HE-LTF field, and the estimated channel state information of the HE-LTF is used to decode information of the data field.

Some medium-speed and low-speed Doppler scenarios are considered in an 802.11ax system. In these scenarios, a channel changes with time. Therefore, a method of inserting a midamble every $M_{MA}$ data symbols in the data field to update channel estimation in real time is proposed.

However, a transmit end can send such a PPDU only when all receive ends of the PPDU support receiving a midamble. Mixed transmission of the PPDU including the midamble to a device that does not support receiving the midamble and a device that supports receiving the midamble cannot be realized. In this way, when the PPDU needs to be transmitted to the device that does not support receiving the midamble and the device that supports receiving the midamble, the PPDU needs to be transmitted twice in sequence, which causes a waste of resources.

SUMMARY

Embodiments of this application provide a PPDU transmission method and a related apparatus, to improve resource utilization efficiency.

According to a first aspect, an implementation of this application provides a PPDU transmission method, including: generating a physical layer protocol data unit PPDU, where the PPDU includes a data field; and sending the PPDU to a first station and a second station.

The first station is a station that does not support receiving a midamble, and the second station is a station that supports receiving the midamble.

A second data field transmitted on a second resource unit allocated to the second station includes a midamble subfield. A first data field transmitted on a first resource unit allocated to the first station includes a useful information subfield, and the useful information subfield includes useful data information.

The useful information subfield meets at least one of the following conditions:

the useful information subfield is located before a first OFDM symbol corresponding to the midamble subfield;

the first data field further includes a padding subfield, and a start location of the padding subfield is before a first OFDM symbol corresponding to the midamble subfield; or the first data field further includes a padding subfield, and a start location of the padding subfield is not later than a first OFDM symbol corresponding to the midamble subfield.

The first station may be a first-type station, or may be a second-type station. The first-type station is a station that does not support receiving the midamble and cannot understand signaling related to the midamble. The second-type station is a station that does not support receiving the midamble, but can understand signaling related to the midamble. The second station can understand signaling related to the midamble, and supports receiving the midamble.

According to the technical solution in this embodiment of this application, in a Doppler scenario, a transmit end sends the PPDU to both the first station that does not support receiving the midamble and the second station that supports receiving the midamble. In addition, the useful information subfield in the first data field received by the first station that does not support receiving the midamble is located before the first OFDM symbol corresponding to the midamble subfield. In this way, resource utilization efficiency can be improved, and an error in reading the data field in the Doppler scenario because an excessively long useful information part carried in the first data field and the first station cannot estimate a channel in real time based on the midamble can also be avoided. This helps the first station that does not support receiving the midamble accurately obtain the useful data information in the data field.

In some implementations, the PPDU further includes a universal signal field (U-SIG). The U-SIG includes a midamble indication subfield, and the midamble indication subfield indicates that the data field of the PPDU includes the midamble subfield. The midamble indication subfield may also be referred to as a Doppler indication subfield. A name of the field is not limited in this application.

For example, for the first-type station, at least one disregard bit in the U-SIG may be used to carry the midamble indication subfield. In other words, the at least one disregard bit in the U-SIG may be used as the midamble indication subfield. In this way, when reading the disregard bit, the first-type first station directly ignores the disregard bit. Escape of the disregard bit indicates the midamble, so that the first-type station can normally receive the data field.

For another example, for the second-type station, the at least one disregard bit in the U-SIG may be used to carry the midamble indication subfield, or at least one validate bit in the U-SIG may be used to carry the midamble indication subfield. In other words, the at least one disregard bit or at least one validate bit in the U-SIG may be used as the midamble indication subfield. It may be understood that the second-type station can understand the disregard bit and the validate bit. Therefore, when the disregard bit or the validate bit is used to carry the midamble indication subfield, the first station that receives the PPDU can understand a meaning indicated by the midamble indication subfield. Therefore, the first station can accurately receive the useful information subfield in the data field, to obtain the useful information.

In some implementations, the PPDU further includes an extremely high throughput signal field (EHT-SIG). The U-SIG or the EHT-SIG includes a midamble periodicity subfield, and the midamble periodicity indication subfield indicates a periodicity of the midamble.

When a value of the midamble indication subfield is a first value, the midamble indication subfield indicates that the data field of the PPDU includes the midamble subfield, and the midamble periodicity indication subfield indicates the periodicity of the midamble.

When the value of the midamble indication subfield is a second value, the midamble indication subfield indicates that the data field of the PPDU does not include the midamble subfield, and the midamble periodicity indication subfield indicates a number of spatial streams, a number of extremely high throughput long training field EHT-LTF symbols, disregard, or validate.

For example, when the first station is the first-type first station, at least one bit (for example, one bit) in a plurality of disregard bits may be used as the midamble indication subfield to indicate that the PPDU includes the midamble subfield, and at least one another bit (for example, one bit) in the plurality of disregard bits may be used as the midamble periodicity subfield to indicate the periodicity of the midamble.

When the first station is the first-type first station, in a non-multiple-user multiple-input multiple-output (MU-MIMO) scenario, at least one bit in a number of space-time streams (NSS) subfield in a user field may be used as the midamble periodicity subfield to indicate the periodicity of the midamble.

Specifically, when the midamble indication subfield indicates that the PPDU does not include the midamble subfield, or when the Doppler subfield indicates that the PPDU does not include the midamble subfield, for example, when the midamble indication subfield indicates the second value (for example, 0), the number of space-time streams subfield normally indicates a number of space-time streams. When the midamble indication subfield indicates that the PPDU includes the midamble subfield, or when the Doppler subfield indicates that the PPDU includes the midamble subfield, for example, when the midamble indication subfield indicates the first value (for example, 1), the number of space-time streams subfield normally indicates the number of space-time streams, and the at least one bit in the number of space-time streams subfield in the user field is used as the midamble periodicity subfield to indicate the periodicity of the midamble. For example, if the number of space-time streams subfield is 4 bits, and the midamble indication subfield indicates that the PPDU includes the midamble subfield, 3 bits of the 4 bits indicate the number of spatial streams, and the other one bit is used as the midamble periodicity subfield to indicate the periodicity of the midamble.

When the first station is the second-type first station, an implementation in which the midamble subfield indicates the periodicity of the midamble may be any implementation in which the midamble subfield indicates the periodicity of the midamble when the first station is the first-type first station.

The following further provides several implementations in which the midamble subfield indicates the periodicity of the midamble when the first station is the second-type first station.

When the first station is the second-type first station, in a possible implementation, the at least one validate bit may indicate the periodicity of the midamble. It should be understood that the U-SIG includes a plurality of disregard bits and a plurality of validate bits. At least one bit in the plurality of disregard bits and the plurality of validate bits may be used as the midamble indication subfield to indicate that the PPDU includes the midamble subfield, and at least one another bit in the plurality of disregard bits and the plurality of validate bits may be used as the midamble periodicity subfield to indicate the periodicity of the midamble.

Specifically, when the first station is the second-type first station, the at least one bit in the plurality of disregard bits and the plurality of validate bits may be used as the midamble indication subfield to indicate that the PPDU includes the midamble subfield, and the at least one another bit (for example, one bit) in the plurality of disregard bits and the plurality of validate bits may be used as the midamble indication subfield to indicate that the PPDU includes the midamble subfield.

When the first station is the second-type first station, in another possible implementation, in the non-multiple-user multiple-input multiple-output (MU-MIMO) scenario, at least one bit (for example, one bit) in a number of EHT-LTF symbols (number of EHT-LTF symbols) subfield in the U-SIG may be used as the midamble periodicity subfield to indicate the periodicity of the midamble.

Specifically, when the midamble indication subfield indicates that the PPDU does not include the midamble subfield, or when the Doppler subfield indicates that the PPDU does not include the midamble subfield, for example, when the midamble indication subfield indicates the second value (for example, 0), the number of EHT-LTF symbols subfield normally indicates a number of EHT-LTF symbols. When the midamble indication subfield indicates that the PPDU includes the midamble subfield, or when the Doppler subfield indicates that the PPDU includes the midamble subfield, for example, when the midamble indication subfield indicates the first value (for example, 1), at least one bit in the number of EHT-LTF symbols subfield is used as the midamble periodicity subfield to indicate the periodicity of the midamble. For example, if the number of EHT-LTF symbols subfield is 3 bits, and the midamble indication subfield indicates that the PPDU includes the midamble subfield, 2 bits of the 3 bits indicate the number of EHT-LTF symbols, and the other 1 bit is used as the midamble periodicity subfield to indicate the periodicity of the midamble.

In some implementations, the periodicity of the midamble subfield may be specified by a standard. For example, it may be specified that the periodicity of the midamble subfield is 20 OFDM symbols. In this way, the PPDU may not include the midamble periodicity indication subfield. In this way, a bit originally used to carry the midamble periodicity indication subfield may be used to carry other information, so that the PPDU can carry more information.

According to a second aspect, an implementation of this application provides a PPDU transmission method, including:

receiving a PPDU, where the PPDU includes a data field; and parsing the PPDU to obtain useful data information.

A Useful Information Subfield Meets at Least One of the Following Conditions:

the useful information subfield is located before a first OFDM symbol corresponding to a midamble subfield;

a first data field further includes a padding subfield, and a start location of the padding subfield is before a first OFDM symbol corresponding to a midamble subfield; or a first data field further includes a padding subfield, and a start location of the padding subfield is not later than a first OFDM symbol corresponding to a midamble subfield.

A first station may be a first-type station, or may be a second-type station. The first-type station is a station that does not support receiving a midamble and cannot understand signaling related to the midamble. The second-type station is a station that does not support receiving the midamble, but can understand the signaling related to the midamble. A second station can understand signaling related to the midamble, and supports receiving the midamble.

According to the technical solution in this embodiment of this application, an error in reading the data field in a Doppler scenario because an excessively long useful information part carried in the first data field and a station that does not support receiving the midamble cannot estimate a channel in real time based on the midamble can be avoided. This helps the station that does not support receiving the midamble accurately obtain the useful data information in the data field.

In some implementations, the PPDU further includes a universal signal field U-SIG. The U-SIG includes a midamble indication subfield, and the midamble indication subfield indicates that the data field of the PPDU includes the midamble subfield. The midamble indication subfield may also be referred to as a Doppler indication subfield. A name of the field is not limited in this application. For related descriptions of the midamble indication subfield, refer to the midamble indication subfield provided in the transmission method in the first aspect.

In some implementations, the PPDU further includes an extremely high throughput signal field EHT-SIG. The U-SIG or the EHT-SIG includes a midamble periodicity subfield, and the midamble periodicity indication subfield indicates a periodicity of the midamble. For related descriptions of the midamble periodicity indication subfield, refer to the midamble periodicity indication subfield provided in the transmission method in the first aspect.

In some implementations, the transmission method is applied to the first-type station, and the parsing the PPDU to obtain the useful data information includes: when it is identified that a value of the midamble indication subfield in the U-SIG is a first value, ignoring the midamble indication subfield; and obtaining and parsing the useful information subfield to obtain the useful data information.

That the midamble indication subfield indicates that the data field includes the midamble subfield is implemented through escape indication of a disregard bit. When the first station is the first-type station, the first station is not capable of understanding the disregard bit. In this case, the first station still ignores the subfield based on an original meaning of the disregard bit, and then continues to receive the PPDU and decodes the first data field when receiving the first data field transmitted on a first resource unit, to obtain the useful data information in the first data field.

In some other implementations, the transmission method is applied to the second-type station, and the parsing the PPDU to obtain the useful data information includes: when it is identified that the value of the midamble indication subfield in the U-SIG is the first value, determining that the data field includes the midamble subfield; obtaining the periodicity of the midamble based on the midamble periodicity indication subfield; obtaining, based on the periodicity of the midamble, the useful information subfield that is located before the first OFDM symbol corresponding to the midamble subfield; and obtaining and parsing the useful information subfield to obtain the useful data information.

The midamble indication subfield and the midamble periodicity indication subfield implement indication through escape indication of the disregard bit or escape indication of a validate bit. When the first station is the second-type station, the first station is capable of understanding the disregard bit and the validate bit. The first station can accurately understand meanings indicated by the midamble indication subfield and the midamble periodicity indication subfield, and determine that the data field includes the midamble subfield and the periodicity of the midamble subfield. In this way, the useful information subfield before the first OFDM symbol corresponding to the midamble is accurately obtained.

According to a third aspect, an implementation of this application further provides a PPDU transmission method, including:

receiving a PPDU, where the PPDU includes a data field, the data field includes a data subfield and one or more midamble subfields spaced apart, the data subfield is separated into at least two segments by the midamble subfields, and the data subfield includes useful data information; and parsing the PPDU to obtain the useful data information.

In such a solution, the midamble subfields are interspersed in the data field, so that when receiving the data field, a receive end device can estimate a channel based on interspersed midambles, and obtain latest channel information in time. Therefore, the receive end device can better receive the data field.

According to a fourth aspect, this application provides a PPDU transmission apparatus. The transmission apparatus may be used as a PPDU transmit end device or deployed on a PPDU transmit end device. The transmit end device may be an access point, or may be a station. The transmission apparatus includes:

a processing unit, configured to generate a PPDU; and a sending unit, configured to send the PPDU to a first station and a second station.

The first station is a station that does not support receiving a midamble, and the second station is a station that supports receiving the midamble.

A second data field transmitted on a second resource unit allocated to the second station includes a midamble subfield. A first data field transmitted on a first resource unit allocated to the first station includes a useful information subfield, and the useful information subfield includes useful data information.

The useful information subfield meets at least one of the following conditions:

the useful information subfield is located before a first OFDM symbol corresponding to the midamble subfield;

the first data field further includes a padding subfield, and a start location of the padding subfield is before a first OFDM symbol corresponding to the midamble subfield; or the first data field further includes a padding subfield, and a start location of the padding subfield is not later than a first OFDM symbol corresponding to the midamble subfield.

The first station may be a first-type station, or may be a second-type station. The first-type station is a station that does not support receiving a midamble and cannot understand signaling related to the midamble. The second-type station is a station that does not support receiving the midamble, but can understand the signaling related to the midamble.

According to the technical solution in this embodiment of this application, in a Doppler scenario, a transmit end sends the PPDU to both the first station that does not support receiving the midamble and the second station that supports receiving the midamble. In addition, the useful information subfield in the first data field received by the first station that does not support receiving the midamble is located before the first OFDM symbol corresponding to the midamble subfield. In this way, resource utilization efficiency can be improved, and an error in reading the data field in the Doppler scenario because an excessively long useful information part carried in the first data field and the first station cannot estimate a channel in real time based on the midamble can also be avoided. This helps the first station that does not support receiving the midamble accurately obtain the useful data information in the data field.

In some implementations, the PPDU further includes a universal signal field U-SIG. The U-SIG includes a midamble indication subfield, and the midamble indication subfield indicates that the data field of the PPDU includes the midamble subfield. The midamble indication subfield may also be referred to as a Doppler indication subfield. A name of the field is not limited in this application.

In some implementations, the PPDU further includes an extremely high throughput signal field EHT-SIG. The U-SIG or the EHT-SIG includes a midamble periodicity subfield, and the midamble periodicity indication subfield indicates a periodicity of the midamble.

When a value of the midamble indication subfield is a first value, the midamble indication subfield indicates that the data field of the PPDU includes the midamble subfield, and the midamble periodicity indication subfield indicates the periodicity of the midamble.

When the value of the midamble indication subfield is a second value, the midamble indication subfield indicates that the data field of the PPDU does not include the midamble subfield, and the midamble periodicity indication subfield indicates a number of spatial streams, a number of extremely high throughput long training field EHT-LTF symbols, disregard (disregard), or validate (validate).

According to a fifth aspect, this application further provides a PPDU transmission apparatus. The transmission apparatus may be used as a PPDU receive end device or deployed on a PPDU receive end device. The receive end device may be a station, or may be an access point. The receive end device may be, for example, the foregoing first station. The transmission apparatus includes:

a receiving unit, configured to receive a PPDU, where the PPDU includes a data field; and a processing unit, configured to parse the PPDU to obtain useful data information.

A Useful Information Subfield Meets at Least One of the Following Conditions:

the useful information subfield is located before a first OFDM symbol corresponding to a midamble subfield;

a first data field further includes a padding subfield, and a start location of the padding subfield is before a first OFDM symbol corresponding to a midamble subfield; or a first data field further includes a padding subfield, and a start location of the padding subfield is not later than a first OFDM symbol corresponding to a midamble subfield.

According to the technical solution in this embodiment of this application, an error in reading the data field in a Doppler scenario because an excessively long useful information part carried in the first data field and a station that does not support receiving the midamble cannot estimate a channel in real time based on the midamble can be avoided. This helps the station that does not support receiving the midamble accurately obtain the useful data information in the data field.

In some implementations, the PPDU further includes a universal signal field U-SIG. The U-SIG includes a midamble indication subfield, and the midamble indication subfield indicates that the data field of the PPDU includes the midamble subfield. The midamble indication subfield may also be referred to as a Doppler indication subfield. A name of the field is not limited in this application. For related descriptions of the midamble indication subfield, refer to the midamble indication subfield provided in the transmission method in the first aspect.

In some implementations, the PPDU further includes an extremely high throughput signal field EHT-SIG. The U-SIG or the EHT-SIG includes a midamble periodicity subfield, and the midamble periodicity indication subfield indicates a periodicity of the midamble. For related descriptions of the midamble periodicity indication subfield, refer to the midamble periodicity indication subfield provided in the transmission method in the first aspect.

In some implementations, the transmission apparatus is a first-type station, or is used for a first-type station. In terms of parsing the PPDU to obtain the useful data information, a processor is specifically configured to: when it is identified that a value of the midamble indication subfield in the U-SIG is a first value, ignore the midamble indication subfield; and obtain and parse the useful information subfield to obtain the useful data information.

That the midamble indication subfield indicates that the data field includes the midamble subfield is implemented through escape indication of a disregard bit. When the first station is the first-type station, the first station is not capable of understanding the disregard bit. In this case, the first station still ignores the subfield based on an original meaning of the disregard bit, and then continues to receive the PPDU and decodes the first data field when receiving the first data field transmitted on a first resource unit, to obtain the useful data information in the first data field.

In some other implementations, the transmission apparatus is a second-type station, or is used for a second-type station. In terms of parsing the PPDU to obtain the useful data information, the processor is specifically configured to: when it is identified that the value of the midamble indication subfield in the U-SIG is the first value, determine that the data field includes the midamble subfield; obtain the periodicity of the midamble based on the midamble periodicity indication subfield; obtain, based on the periodicity of the midamble, the useful information subfield located before the first OFDM symbol corresponding to the midamble subfield; and obtain and parse the useful information subfield to obtain the useful data information.

The midamble indication subfield and the midamble periodicity indication subfield implement indication through escape indication of the disregard bit or escape indication of a validate bit. When the first station is the second-type station, the first station is capable of understanding the disregard bit and the validate bit. The first station can accurately understand meanings indicated by the midamble indication subfield and the midamble periodicity indication subfield, and determine that the data field includes the midamble subfield and the periodicity of the midamble subfield. In this way, the useful information subfield before the first OFDM symbol corresponding to the midamble is accurately obtained.

According to a sixth aspect, this application further provides a PPDU transmission apparatus. The transmission apparatus may be used as a PPDU receive end device or deployed on a PPDU receive end device. The receive end device may be a station, or may be an access point. The receive end device may be, for example, the second station in the foregoing embodiments. The transmission apparatus includes:

a receiving unit, configured to receive a PPDU, where the PPDU includes a data field, the data field includes a data subfield and one or more midamble subfields spaced apart, the data subfield is separated into at least two segments by the midamble subfields, and the data subfield includes useful data information; and a processing unit, configured to parse the PPDU to obtain the useful data information.

In such a solution, the midamble subfields are interspersed in the data field, so that when receiving the data field, the receive end device can estimate a channel based on interspersed midambles, and obtain latest channel information in time. Therefore, the receive end device can better receive the data field.

According to a seventh aspect, this application provides a PPDU transmission apparatus. The transmission apparatus may be a communication device, or may be deployed on a communication device. The transmission apparatus includes a processor. The processor is coupled to a memory. When the processor executes a computer program or instructions in the memory, the method in any implementation of the first aspect is performed.

Optionally, the apparatus further includes a memory.

Optionally, the apparatus further includes a communication interface, and the processor is coupled to the communication interface.

Optionally, there are one or more processors, and there are one or more memories.

Optionally, the memory may be integrated with the processor, or the memory and the processor are separately disposed.

Optionally, a transceiver may include a transmitter (transmitter) and a receiver (receiver).

In an implementation, the transmission apparatus is an access point or a station. When the communication device is the access point or the station, the communication interface may be a transceiver or an input/output interface. Optionally, the transceiver may be a transceiver circuit. Optionally, the input/output interface may be an input/output circuit.

In another implementation, the transmission apparatus is a chip or a chip system. When the apparatus is the chip or the chip system, the communication interface may be an input/output interface, an interface circuit, an output circuit, an input circuit, a pin, a related circuit, or the like on the chip or in the chip system. The processor may alternatively be embodied as a processing circuit or a logic circuit.

According to an eighth aspect, this application provides a communication system, and the communication system includes the transmission apparatuses in the fourth aspect to the sixth aspect.

According to a ninth aspect, this application provides a computer program product. The computer program product includes a computer program (may also be referred to as code or instructions). When the computer program is run, a computer is enabled to perform the method in any possible implementation of the first aspect to the third aspect.

According to a tenth aspect, this application provides a computer-readable storage medium. The computer-readable storage medium stores a computer program (may also be referred to as code or instructions). When the computer program is run on a computer, the computer is enabled to perform the method in any possible implementation of the first aspect to the third aspect.

According to an eleventh aspect, this application further provides a circuit, including a processor and an interface, and configured to execute a computer program or instructions stored in a memory, to perform the method in any possible implementation of the first aspect to the third aspect.

BRIEF DESCRIPTION OF THE DRAWINGS

FIG. 4A is a schematic diagram of a structure of a PPDU according to this application;

FIG. 4B is a schematic diagram of another structure of a PPDU according to this application;

FIG. 5 is a schematic diagram of another structure of a PPDU according to this application;

FIG. 8A is a schematic diagram of a PPDU transmission scenario according to an embodiment of this application;

FIG. 8B is a schematic diagram of a PPDU transmission scenario according to an embodiment of this application;

FIG. 8C is a schematic diagram of a PPDU transmission scenario according to an embodiment of this application;

FIG. 9A is a schematic diagram of a PPDU transmission scenario according to an embodiment of this application;

FIG. 9B is a schematic diagram of a PPDU transmission scenario according to an embodiment of this application;

FIG. 9C is a schematic diagram of a PPDU transmission scenario according to an embodiment of this application;

DETAILED DESCRIPTION OF ILLUSTRATIVE EMBODIMENTS

The following describes technical solutions of this application with reference to accompanying drawings.

Figure 1:
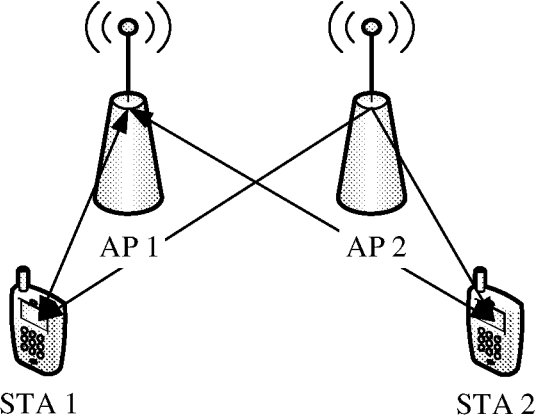
FIG. 1 is a schematic diagram of a network architecture of a communication system according to an embodiment of this application.

FIG. 1 is used as an example to describe a network structure to which a data transmission method in this application is applicable. FIG. 1 is a schematic diagram of the network structure according to an embodiment of this application. The network structure may include one or more access point (AP) stations and one or more non access point stations (non access point stations, non-AP STAs). For ease of description, the access point station is referred to as an access point (AP), and the non access point station is referred to as a station (STA) in this specification. The APs are, for example, an AP 1 and an AP 2 in FIG. 1, and the STAs are, for example, a STA 1 and a STA 2 in FIG. 1.

The access point may be an access point used by a terminal device (for example, a mobile phone) to access a wired (or wireless) network, and is mainly deployed at home, in a building, and in a park. A typical coverage radius is tens of meters to hundreds of meters. Certainly, the access point may alternatively be deployed outdoors. The access point is equivalent to a bridge that connects the wired network and the wireless network. A main function of the access point is to connect various wireless network clients together and then connect the wireless network to the Ethernet. Specifically, the access point may be a terminal device (for example, a mobile phone) or a network device (for example, a router) with a wireless-fidelity (Wi-Fi) chip.

The access point may be a device that supports the 802.11be standard. Alternatively, the access point may be a device that supports various wireless local area network (WLAN) standards of an 802.11 family such as 802.11ax, 802.11ac, 802.11n, 802.11g, 802.11b, and 802.11a. The access point in this application may be an extremely high throughput (EHT) AP, or may be an access point applicable to a future-generation Wi-Fi standard.

The access point may include a processor and a transceiver. The processor is configured to control and manage an action of the access point, and the transceiver is configured to receive or send information.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, a computer supporting a Wi-Fi communication function, or the like.

Optionally, the station may support the 802.11be standard. The station may also support various wireless local area network (WLAN) standards of the 802.11 family such as 802.11ax, 802.11ac, 802.11n, 802.11g, 802.11b, and 802.11a.

The station may include a processor and a transceiver. The processor is configured to control and manage an action of the access point, and the transceiver is configured to receive or send information.

The station in this application may be a high efficient (HE) STA or an extremely high throughput (EHT) STA, or may be a STA applicable to the future-generation Wi-Fi standard.

For example, the access point and the station may be devices used in the internet of vehicles, internet of things nodes, sensors, or the like in the internet of things (IoT), smart cameras, smart remote controls, smart water or electricity meters, or the like in smart home, or sensors in smart city.

The access point and the station in this embodiment of this application may also be collectively referred to as a PPDU transmission apparatus. The PPDU transmission apparatus may include a hardware structure and a software module, and the foregoing functions are implemented in a form of the hardware structure, the software module, or a combination of the hardware structure and the software module. A function in the foregoing functions may be implemented in the form of the hardware structure, the software module, or the combination of the hardware structure and the software module.

Figure 2:
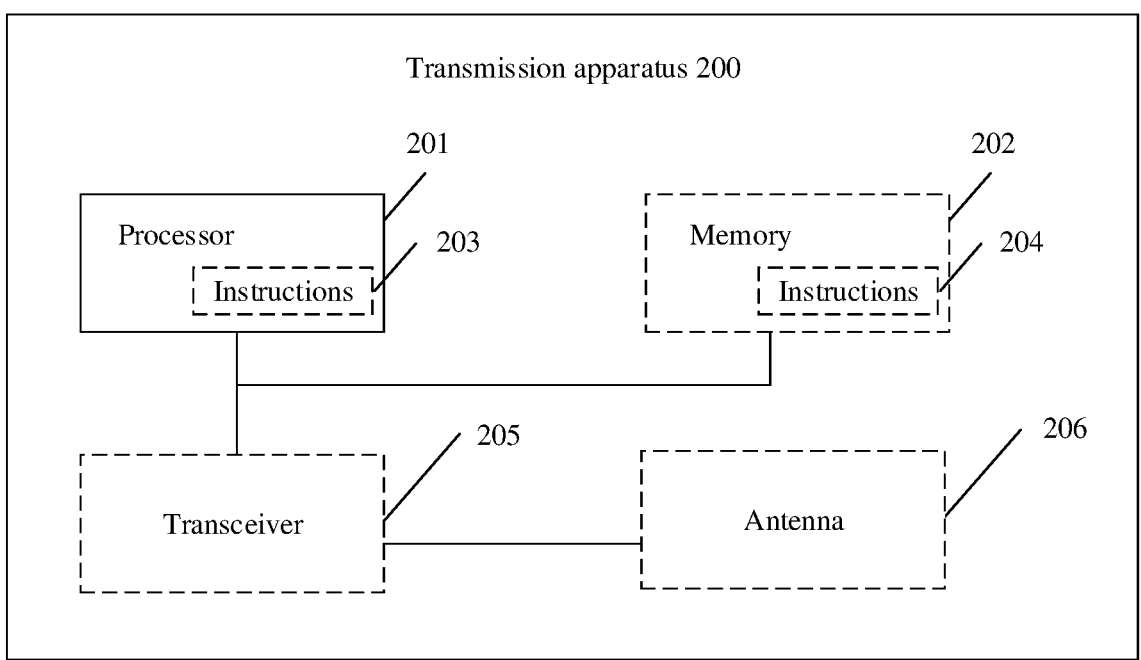
FIG. 2 is a schematic diagram of a structure of a transmission apparatus according to an embodiment of this application.

FIG. 2 is a schematic diagram of a structure of a PPDU transmission apparatus according to an embodiment of this application. As shown in FIG. 2, the transmission apparatus 200 may include a processor 201 and a transceiver 205, and optionally further includes a memory 202.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, and the computer program, the software code, or the instructions 204 may also be referred to as firmware. The processor 201 may control a MAC layer and a PHY layer by running a computer program, a software code, or instructions 203 in the processor 201, or by invoking the computer program, the software code, or the instructions 204 stored in the memory 202, to implement a data transmission method provided in the following embodiments of this application.

The processor 201 may be a central processing unit (CPU), and the memory 202 may be, for example, a read-only memory (ROM), or a random access memory (RAM).

The processor 201 and the transceiver 205 described in this application may be implemented in an integrated circuit (IC), an analog IC, a radio frequency integrated circuit RFIC, a mixed-signal IC, an application-specific integrated circuit (ASIC), a printed circuit board (PCB), an electronic device, or the like.

The transmission apparatus 200 may further include an antenna 206. Modules included in the transmission apparatus 200 are merely examples for description. This is not limited in this application.

As described above, the transmission apparatus 200 described in the embodiment may be an access point or a station. However, a scope of the transmission apparatus described in this application is not limited thereto, and the structure of the transmission apparatus may not be limited to FIG. 2. The transmission apparatus may be an independent device or may be a part of a large device. For example, the transmission apparatus may be implemented in the following forms: (1) an independent integrated circuit IC, a chip, a chip system, or a subsystem; (2) a set including one or more ICs, and optionally, the IC set may further include a storage component for storing data and instructions; (3) a module that can be embedded in another device; (4) a receiver, an intelligent terminal, a wireless device, a hand-held device, a mobile unit, a vehicle-mounted device, a cloud device, or an artificial intelligence device; and (5) others.

Figure 3:
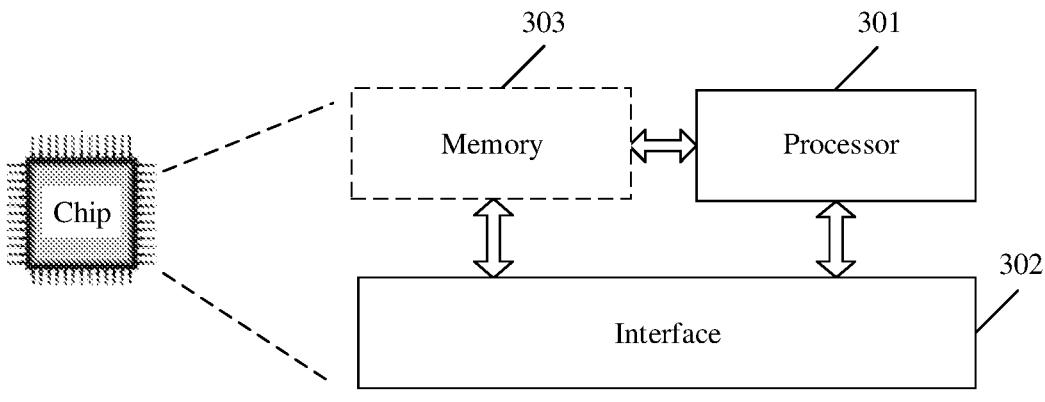
FIG. 3 is a schematic diagram of a structure of a chip according to an embodiment of this application.

For a case in which the transmission apparatus is implemented in the form of the chip or the chip system, refer to a schematic diagram of a structure of a chip or a chip system shown in FIG. 3. The chip or the chip system shown in FIG. 3 includes a processor 301 and an interface 302. There may be one or more processors 301, and there may be a plurality of interfaces 302. Optionally, the chip or the chip system may include a memory 303.

Embodiments of this application do not limit the protection scope and applicability of the claims. Persons skilled in the art may adaptively change functions and deployments of elements in this application, or omit, replace, or add various processes or components as appropriate without departing from the scope of embodiments of this application.

802.11ax provides a high efficient single user physical layer protocol data unit (HE SU PPDU) structure and a high efficient multiple user physical layer protocol data unit (HE MU PPDU) structure respectively for single-user transmission and multi-user transmission.

FIG. 4A is a schematic diagram of a structure of the HE SU PPDU provided in 802.11ax. The HE SU PPDU includes a legacy short training field (legacy short training field, L-STF), a legacy long training field (L-LTF), a legacy signal field (L-SIG), a repeated legacy signal field (RL-SIG), a high efficient signal field A (HE-SIG A), a high efficient short training field (HE-STF), a high efficient long training field (HE-LTF), a data (data) field, and a packet extension (PE) field. Compared with the HE SU PPDU, the HE MU PPDU further includes an HE-SIG-B field used for resource unit allocation. In a scenario of HE MU PPDU transmission, bandwidth includes a plurality of resource units, and the resource units are allocated to different STAs.

In a high-speed mobility scenario, a Doppler effect causes a channel change. If a number of symbols in the data field is excessively large (excessively long), the channel change may affect receiving of the data field. In the high-speed mobility scenario, midambles may be interspersed in the data field of the PPDU, so that when receiving the data field, a receive end device can estimate a channel based on the interspersed midambles, and obtain latest channel information in time. Therefore, the receive end device can better receive the data field.

Figure 4B:
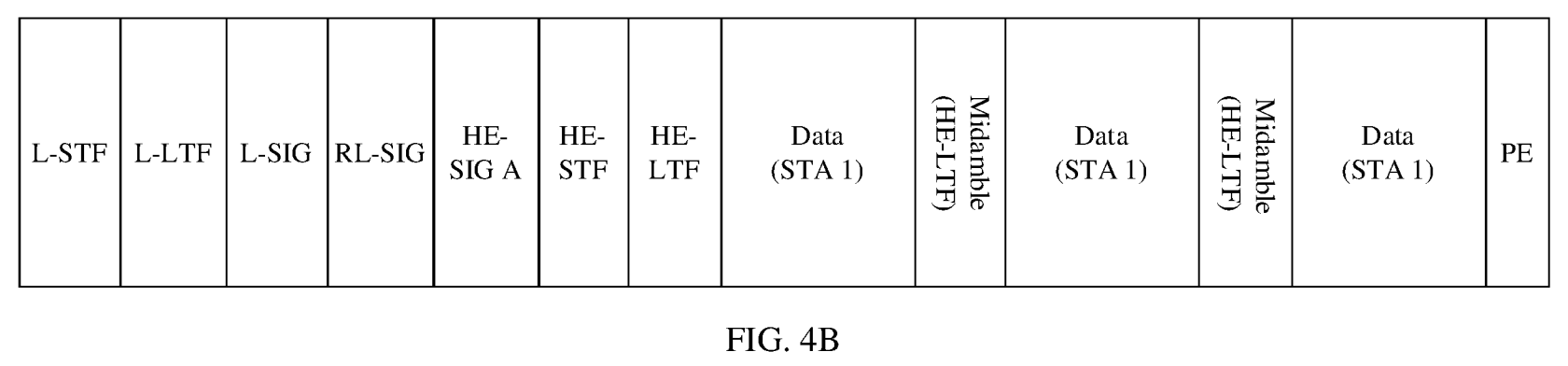

FIG. 4B is a schematic diagram of a structure of an HE SU PPDU including midambles provided in 802.11ax. The midambles are interspersed in a data field, and a station at a receive end may estimate a channel based on the midambles. Each midamble includes an HE-LTF field. The station at the receive end refreshes the channel based on the midambles, and this helps avoid that the data field in the PPDU cannot be accurately read in a high-speed mobility scenario due to a channel change caused by a Doppler effect. The structure of the PPDU including the midambles may be understood as a PPDU in a Doppler mode. Similarly, the HE MU PPDU can also support the Doppler mode, to avoid that a data field in the PPDU cannot be accurately read in the high-speed mobility scenario due to the channel change caused by the Doppler effect.

A structure of a PPDU provided in a next-generation standard 802.11be Release 1 (R1) of 802.11ax is shown in FIG. 5. The PPDU provided in 802.11be R1 includes an L-STF, an L-LTF, an L-SIG, an RL-SIG, a U-SIG, an EHT-SIG, an EHT-STF, an EHT-LTF, a data field, and a PE field. 802.11be R1 does not support a Doppler mode. In other words, an 802.11be R1 device does not support receiving a PPDU including a midamble. However, some 802.11be Release 2 (R2) devices may support receiving the PPDU including the midamble. 802.11be R1 and 802.11be R2 are two versions of the 802.11be standard. 802.11be R2 may further change a structure or signaling of the PPDU, but the previous R1 device does not understand 802.11be R2.

In this way, a receive end device may be a device that supports receiving the midamble, or may be a device that does not support receiving the midamble. In a scenario in which a transmit end device needs to send a PPDU to a plurality of receive end devices, it is very likely that the plurality of receive end devices include both a device that supports receiving a midamble and a device that does not support receiving the midamble. In this case, if the PPDU is sent in a sending manner of the PPDU provided in 802.11ax, the transmit end device needs to send the PPDU twice in sequence. This causes a large waste of resources.

When the PPDU including the midamble needs to be sent to a plurality of receive end devices, if the plurality of receive end devices include both a device that supports receiving the midamble and a device that does not support receiving the midamble, the transmit end may send, to the plurality of receive end devices, a PPDU that does not include a midamble subfield. A Doppler effect may cause a channel change. If a number of symbols in the data field is excessively large (excessively long), the channel change may affect receiving of the data field. As a result, an 802.11be R2 device that can better adapt to a high-speed mobility scenario cannot accurately receive the data field in the high-speed mobility scenario, and performance cannot be fully utilized. In addition, the 802.11be R1 device cannot avoid an impact of the Doppler effect on receiving of the data field, and therefore cannot accurately receive the data field.

For ease of describing the technical solutions of this application, the following first describes an example of a structure of a U-SIG in an EHT PPDU provided in 802.11be R1. Subfields included in the U-SIG field in the EHT PPDU is shown in Table 1.

TABLE 1

| Field (field) | Category (category) | Subfield (subfield) | Bits (bits) | Description |
|---|---|---|---|---|
| U-SIG | Version independent (version independent) | PHY version identifier (version identifier) subfield | 3 | Indicates which generation the PPDU is, since an EHT generation |
| | | PPDU bandwidth (bandwidth, BW) subfield | 3 | Indicates bandwidth of a data packet |
| | | Uplink/Downlink (UL/DL) subfield | 1 | Indicates whether the PPDU is sent in uplink/downlink |
| | | Basic service set color (BSS color) subfield | 6 | Indicates a color identifier of a BSS (Basic Service Set, basic service set, which is equivalent to a cell), which is equivalent to identification information of the cell in general |
| | | Transmit opportunity (TXOP) subfield | 7 | Indicates a transmit opportunity (TXOP) |
| | | Disregard (disregard) bit | 5 | Disregard-reserved bit |
| | | Validate (validate) bit | 1 | Validate-reserved bit |
| | Version dependent (version dependent) | Punctured channel indication (punctured channel indication) subfield | 5 | Indicates a punctured channel |
| | | Validate bit | 1 | Validate-reserved bit |
| | | PPDU type and compression mode subfield | 2 | Indicates a PPDU type and a compression mode |
| | | validate | 1 | Validate-reserved bit |
| | | EHT-SIG coding and modulation scheme (EHT-SIG MCS) subfield | 2 | Indicates a coding and modulation scheme of an EHT-SIG |
| | | Number of EHT-SIG symbols (number of EHT-SIG symbols) subfield | 5 | Indicates a number of EHT-SIG symbols |
| | CRC&tail | CRC in the U-SIG (CRC in U-SIG) | 4 | Used to verify information |
| | | tail in the U-SIG (tail in U-SIG) | 6 | A tail bit used to end encoding |
| EHT-SIG | Version dependent (version dependent) (U-SIG overflow (Overflow)) | Spatial reuse subfield | 4 | Spatial reuse |
| | | GI + LTF size subfield | 2 | Indicates a guard interval (GI) and an EHT-LTF size |
| | | Number of EHT-LTF symbols (Number of EHT-LTF symbols) subfield | 3 | Indicates a number of EHT-LTF symbols |
| | | Pre-FEC padding subfield | 2 | Indicates a pre-forward error control (FEC) padding factor |
| | | LDPC extra symbol segment subfield | 1 | Indicates whether an extra symbol segment is transmitted after LDPC (low density parity check) coding is used |
| | | Disregard bit | 4 | Disregard-reserved bit |
| | | PE ambiguity (disambiguity) subfield | 1 | Indicates whether data packet extension is ambiguous |

In 802.11be R1, reserved bits are classified into two types: a disregard bit and a validate bit. Default values of the disregard bit and the validate bit are 1. When the two reserved bits are non-default values (for example, 0), the device that supports 802.11be R1 cannot understand meanings indicated by the two reserved bits. Specifically, if a disregard bit in a PPDU is a non-default value (for example, 0), a 802.11be R1 STA that receives the PPDU chooses to ignore the disregard bit and continues to receive information. If a validate bit in the PPDU is a non-default value (for example, 0), the station that supports 802.11be R1 and that receives the PPDU directly stops receiving the information about the PPDU. A device that supports 802.11be R2 can understand the meanings indicated by the disregard bit and the validate bit.

This application provides a solution in which a PPDU can be transmitted to both a device that does not support receiving a midamble and a device that supports receiving a midamble. Specifically, a transmit end device transmits a PPDU to both a first receive end device that does not support receiving a midamble and a second receive end device that supports receiving a midamble. A second data field of the PPDU transmitted on a second resource unit allocated to the second receive end device includes a data subfield and a midamble subfield. A first data field of the PPDU transmitted on a first resource unit allocated to the first receive end device includes a useful information subfield, and the useful information subfield is located before a first OFDM symbol corresponding to the midamble subfield. The useful information subfield includes useful data information. In this way, the transmit end device transmits the PPDU to both the device that does not support receiving a midamble and the device that supports receiving a midamble, thereby improving resource utilization efficiency. Even in a high-speed mobility scenario, a length of the useful information subfield of the first receive end device is less than a periodicity of the midamble subfield. In this way, impact of a Doppler effect on accuracy of receiving the data field by the first receive end device can be reduced.

Figure 6A:
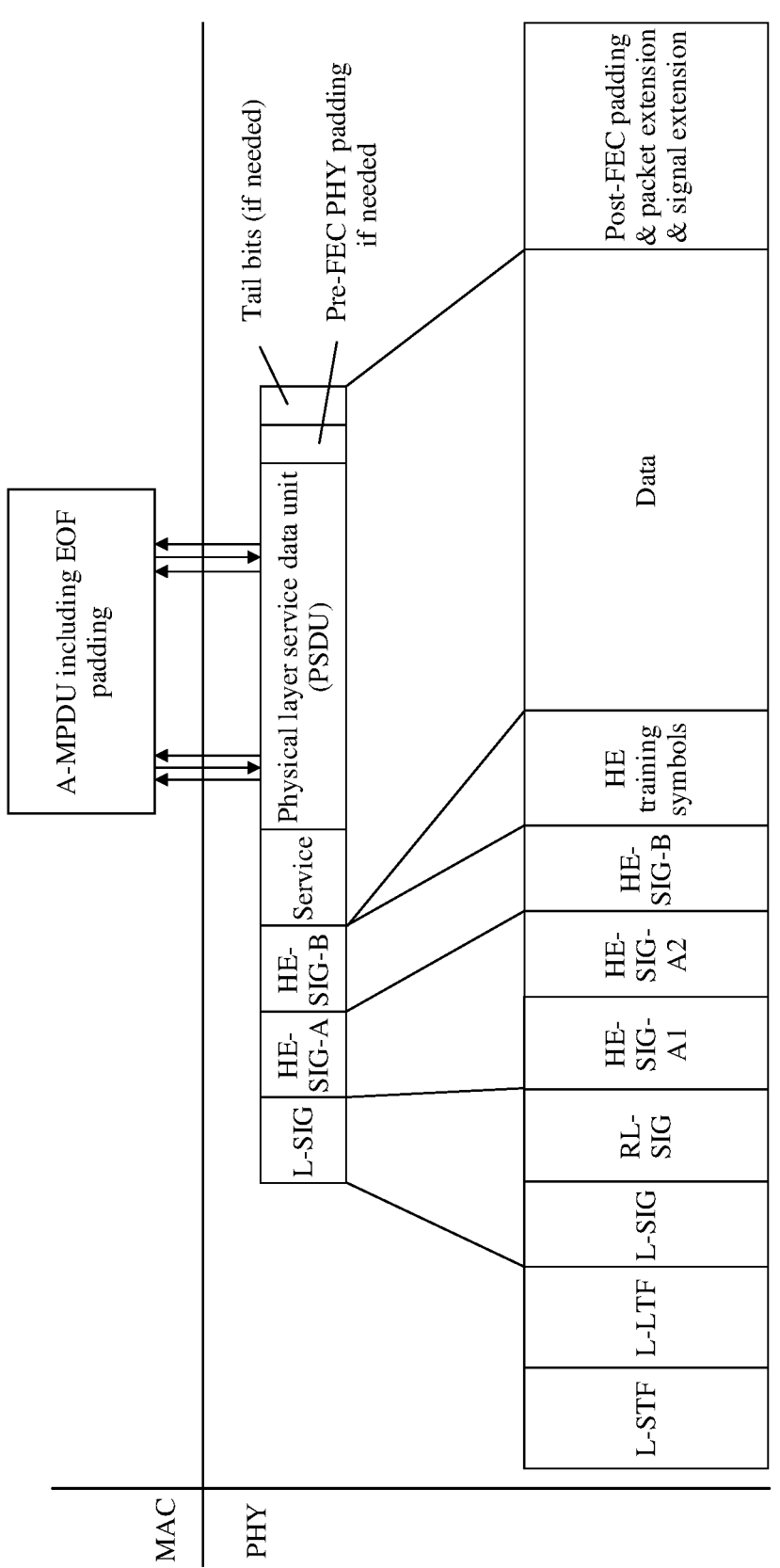
FIG. 6A is a schematic flowchart of sending a PPDU according to an application.
Figure 6B:
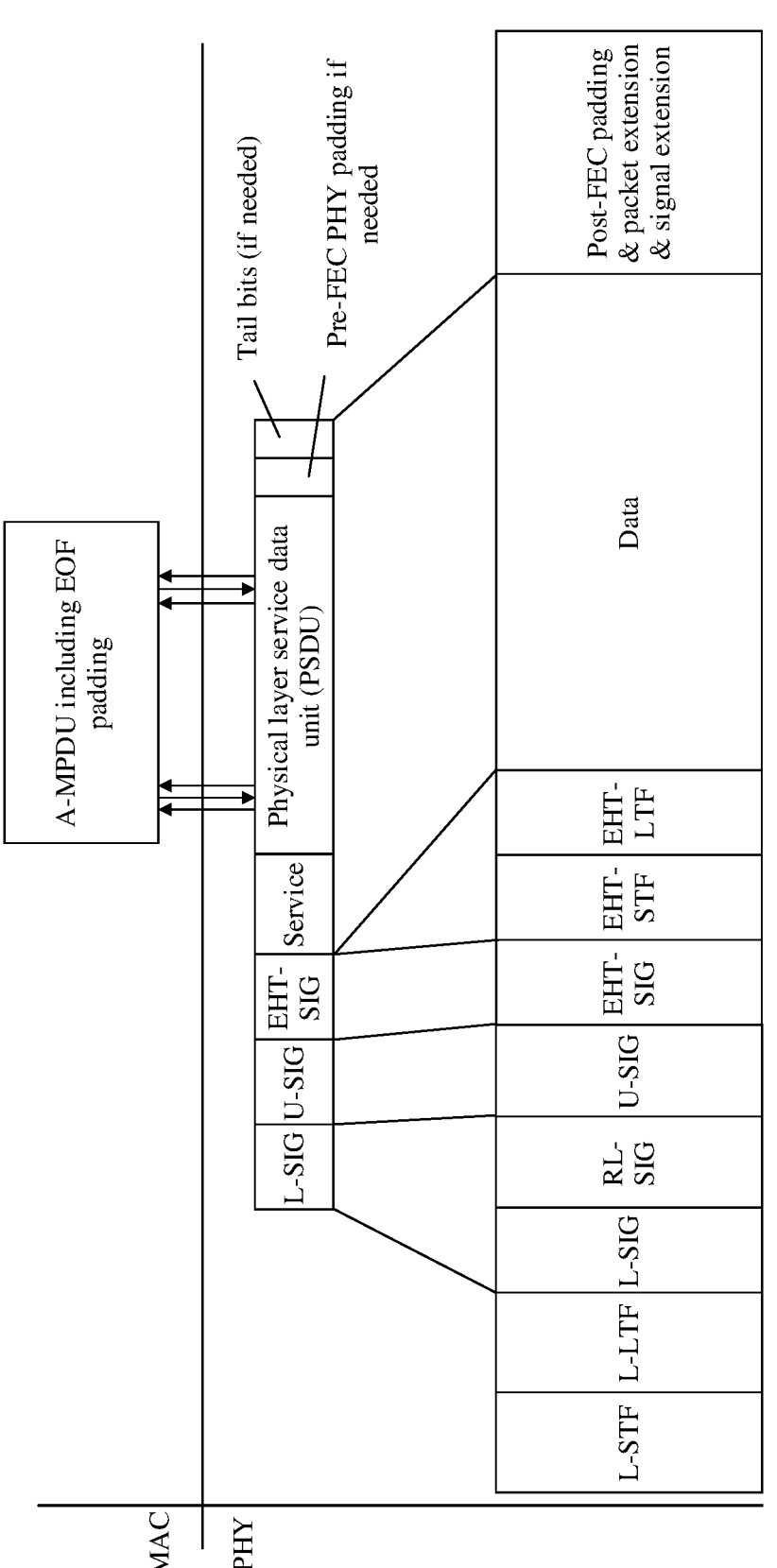
FIG. 6B is another schematic flowchart of sending a PPDU according to an application.
Figures 6C, 7A:
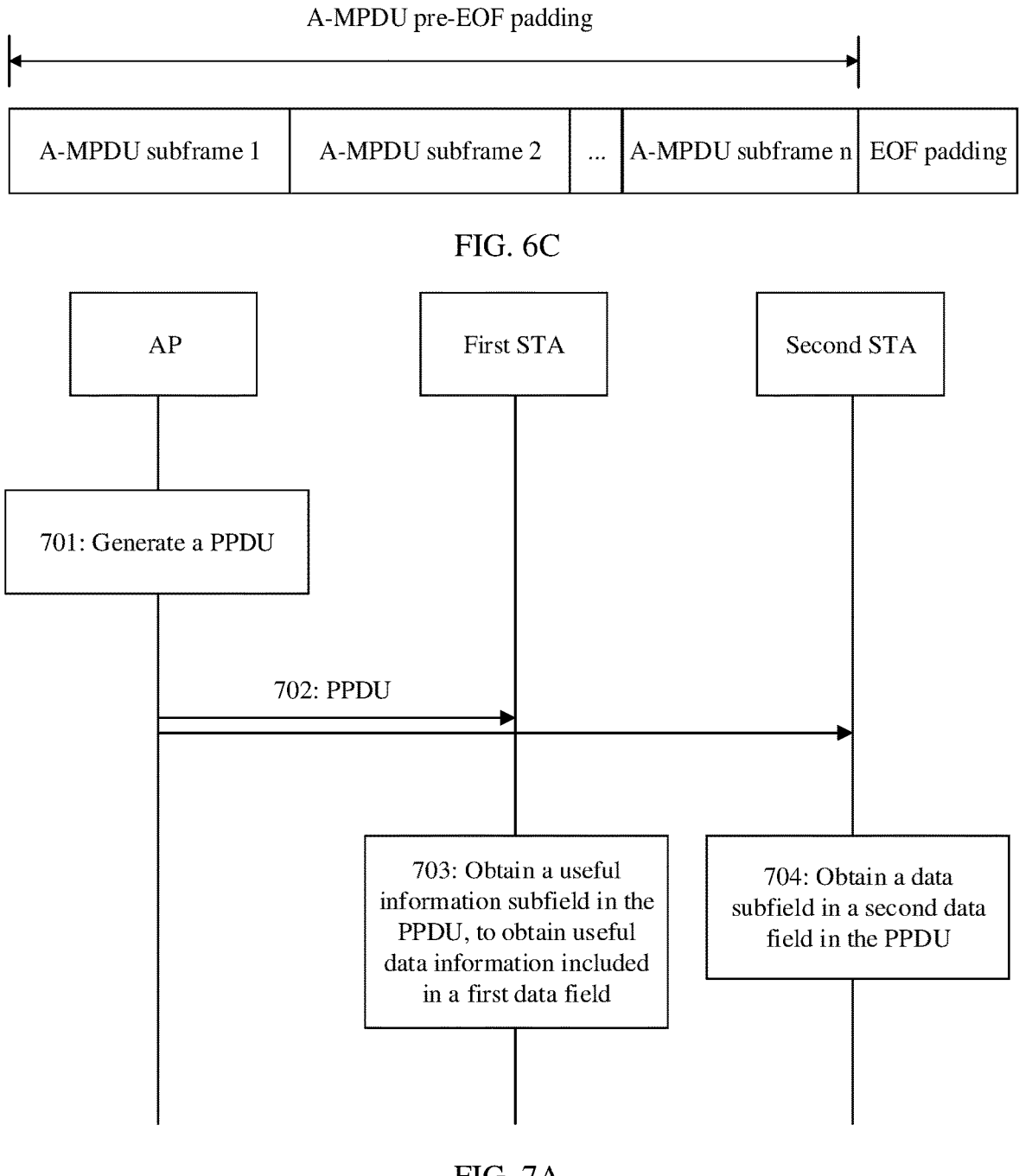
FIG. 6C is a schematic diagram of a structure of an A-MPDU according to this application.
FIG. 7A is a schematic flowchart of a PPDU transmission method according to an embodiment of this application.

A procedure in which the transmit end device sends the PPDU at a physical layer is shown in FIG. 6A and FIG. 6B. FIG. 6A is a schematic flowchart of sending a PPDU corresponding to 802.11ax, and FIG. 6B is a schematic flowchart of sending a PPDU corresponding to 802.11be. A data field includes a service subfield and an aggregate medium access control protocol data unit (A-MPDU) subfield. The service subfield indicates an initial value of a scrambler. A structure of the A-MPDU subfield is shown in FIG. 6C. The A-MPDU subfield includes an A-MPDU pre-end-of-frame padding (pre-EOF padding) part and an EOF delimiter.

The A-MPDU pre-EOF padding part carries useful data information, and the EOF delimiter indicates ending of the useful data information. In other words, the A-MPDU pre-EOF padding part may be understood as the useful information subfield in this embodiment of this application. The A-MPDU pre-EOF padding part includes a plurality of A-MPDU subframes (such as an A-MPDU subframe 1, an A-MPDU subframe 2, . . . , and an A-MPDU subframe n in FIG. 6C).

The following describes the technical solutions of this application in detail with reference to a PPDU transmission method in embodiments of this application. In embodiments of this application, an embodiment in which an AP sends a PPDU to a STA is used for description. The data transmission method in this application is also applicable to a scenario in which an AP sends a PPDU to another AP, and a scenario in which a STA sends a PPDU to another STA. In different scenarios, names of transmitted PPDUs and signal fields in the PPDUs are different, but functions and roles thereof are similar. Details are not described in embodiments of this application.

In a schematic flowchart shown in FIG. 7A, a PPDU transmission method provided in this application may include the following steps.

701: An AP generates a PPDU.

The PPDU includes a data field. Optionally, for a structure of the PPDU, refer to a schematic diagram of a structure of a PPDU shown in FIG. 5. The PPDU may further include an L-STF, an L-LTF, an L-SIG, an RL-SIG, a U-SIG, an EHT-SIG, an EHT-STF, an EHT-LTF, and a PE field.

The L-STF, the L-LTF, the L-SIG, the RL-SIG, the U-SIG, the EHT-SIG, the EHT-STF, and the EHT-LTF are a part of structures in a physical layer header (or referred to as a preamble part) of the PPDU.

702: The AP sends the PPDU.

Specifically, the AP sends the PPDU to a plurality of STAs. The PPDU may be transmitted through OFDMA.

The plurality of STAs include a first STA and a second STA. The AP sends the PPDU to the first STA on a first resource unit allocated to the first STA, and sends the PPDU to the second STA on a second resource unit allocated to the second STA. A data field in the PPDU transmitted on the first resource unit is different from a data field in the PPDU transmitted on the second resource unit.

The AP may send PPDUs to the plurality of STAs in an aggregate PPDU (aggregate PPDU, A-PPDU) manner.

When the AP sends PPDUs to the plurality of STAs in the A-PPDU manner, the plurality of PPDUs are combined into one A-PPDU. The plurality of PPDUs may support different protocol versions. The A-PPDU may be transmitted through the OFDMA.

In this embodiment of this application, the first STA is a STA that does not support receiving a midamble, and the second STA is a STA that supports receiving a midamble. The second STA is a STA that supports receiving the midamble. For example, the second STA may be a STA that supports 802.11ax and supports receiving the midamble. Alternatively, the second STA may be a STA that supports 802.11be R2 and supports receiving the midamble. Alternatively, the second STA may be a STA that supports a Wi-Fi standard after 802.11 be R2 and supports receiving the midamble.

The first data field in the PPDU transmitted on the first resource unit includes a useful information subfield (for example, may be referred to as an aggregate medium access control protocol data unit pre-end-of-frame padding (A-MPDU EOF padding) subfield). The second data field of the PPDU transmitted on the second resource unit includes a data subfield and a midamble subfield. The useful information subfield includes useful data information of the data field. In this embodiment of this application, the useful data information may also be referred to as useful information. The useful information subfield includes a delimiter, and the delimiter includes a 1-bit EOF indication indicating ending of the useful information subfield.

The useful information subfield is located before a first OFDM symbol corresponding to the midamble subfield. In other words, the useful information subfield ends before the first OFDM symbol corresponding to the midamble subfield.

In other words, the first data field further includes a padding subfield, and a start location of the padding subfield is before the first OFDM symbol corresponding to the midamble subfield. In other words, the first data field further includes the padding subfield, and the start location of the padding subfield is not later than the first OFDM symbol corresponding to the midamble subfield.

In this embodiment of this application, the first STA may be a first-type STA, or may be a second-type STA. The first-type STA is a STA that does not support receiving the midamble and cannot understand signaling related to the midamble. The second-type STA is a STA that does not support receiving the midamble, but can understand the signaling related to the midamble.

For example, if a device that supports 802.11be R2 can understand the signaling related to the midamble, the first-type STA may be a STA that supports 802.11be R1, and the second-type STA may be a STA that supports 802.11be R2 and does not support receiving the midamble.

703: The first STA obtains the useful information subfield in the PPDU, to obtain the useful data information included in the first data field.

Specifically, the first STA receives the PPDU from the first resource unit, and parses the PPDU to obtain the useful information subfield in the first data field.

704: The second STA obtains the data subfield in the second data field in the PPDU.

The second STA receives the PPDU from the second resource unit, and parses the PPDU to obtain useful data information in the second data field.

According to the technical solution in this embodiment of this application, in a Doppler scenario, the AP sends the PPDU to both the first STA that does not support receiving the midamble and the second STA that supports receiving the midamble. In addition, the useful information subfield in the first data field received by the first STA that does not support receiving the midamble is located before the first OFDM symbol corresponding to the midamble subfield. In this way, resource utilization efficiency can be improved, and an error in reading the data field in the Doppler scenario because an excessively long useful information part carried in the first data field and the first station cannot estimate a channel in real time based on the midamble can also be avoided. This helps the first STA that does not support receiving the midamble accurately obtain the useful data information in the data field.

Optionally, in this embodiment of this application, a number of OFDM symbols in a preamble part of the PPDU transmitted on the first resource unit is the same as a number of OFDM symbols in a preamble part of the PPDU transmitted on the second resource unit. A number of OFDM symbols in the first data field transmitted on the first resource unit is the same as a number of OFDM symbols in the second data field transmitted on the second resource unit. In this way, a length of the PPDU transmitted on the first resource unit can be the same as a length of the PPDU transmitted on the second resource unit.

The second data field transmitted on the second resource unit includes n midamble subfields, where n≥1. $M_{MA}$ data symbols are spaced between the n midamble subfields. The data field transmitted on the first resource unit includes a padding (padding) subfield after the first OFDM symbol corresponding to the midamble subfield. In this way, the number of OFDM symbols of the data field transmitted on the first resource unit can be the same as the number of OFDM symbols of the data field transmitted on the second resource unit by setting the padding subfield.

Optionally, in this embodiment of this application, the first data field may include the padding subfield or the midamble subfield in a location of the OFDM symbol corresponding to the midamble subfield in the second resource unit. In this way, when the AP simultaneously sends the PPDU to the plurality of STAs, a low peak-to-average power ratio (PAPR) is ensured, and interference to another PPDU can also be reduced.

With reference to FIG. 8A to FIG. 8C, the following describes a solution in which the AP transmits the PPDU to both the first STA and the second STA when the first STA is the first-type STA.

FIG. 8A is a schematic diagram of structures of a PPDU. The first STA is the first-type STA, and the second STA is a STA that supports 802.11be R2 and supports receiving the midamble. The plurality of STAs may further include a third STA and a fourth STA. The third STA is a STA that supports 802.11be R2 and supports receiving a midamble. The fourth STA is a STA that supports 802.11ax.

The first data field of the PPDU transmitted on the first resource unit allocated to the first STA includes a useful information subfield (data-R1) and padding subfields.

The second data field of the PPDU transmitted on the second resource unit allocated to the second STA includes data subfields (data-R2) and a plurality of midamble subfields. The plurality of midamble subfields are interspersed in the data subfields.

A third data field of the PPDU transmitted on a third resource unit allocated to the third STA includes data subfields (data-R2) and a plurality of midamble subfields. The plurality of midamble subfields are interspersed in the data subfields.

A fourth data field of the PPDU transmitted on a fourth resource unit allocated to the fourth STA includes data subfields (data-HE) and a plurality of midamble (midamble-HE) subfields. The plurality of midamble subfields are interspersed in the data subfields. The data subfield (midamble-HE) is a useful information subfield of the STA sending 802.11ax.

In a schematic diagram of structures of a PPDU shown in FIG. 8B, an OFDM symbol that corresponds to the midamble subfield transmitted on the second resource unit and that is in the first resource unit may be also used to transmit the midamble subfield. In other words, the first data field may also include a midamble subfield, and a time domain position of the midamble subfield is the same as a time domain position of the midamble subfield in the second data field. In this way, when the AP simultaneously sends the PPDU to the plurality of STAs, the low peak-to-average power ratio (peak-to-average power ratio, PAPR) is ensured, and interference to the another PPDU can also be reduced.

In a schematic diagram of structures of a PPDU shown in FIG. 8C, the data field transmitted on the first resource unit may include only a useful information subfield (data-R1), and does not include a padding subfield or a midamble subfield. In other words, the data field of the PPDU sent to the first STA may carry only useful information.

With reference to FIG. 9A to FIG. 9C, the following describes a solution in which the AP transmits the PPDU to both the first STA and the second STA when the first STA is the second-type STA.

FIG. 9A is a schematic diagram of structures of a PPDU. The AP sends the PPDU to the plurality of STAs. The plurality of STAs include the first STA, the second STA, a third STA, and a fourth STA. Data field parts of the PPDU received by the first STA, the second STA, the third STA, and the fourth STA are different. The first STA is the second-type STA (for example, a STA that supports 802.11be R2 and that does not support (without support, w/o support) receiving the midamble). The second STA and the third STA each are a STA that supports 802.11be R2, support (with support, w/support) receiving a midamble, and can understand a field related to the midamble. The fourth STA is a STA that supports 802.11ax.

The first data field of the PPDU transmitted on the first resource unit allocated to the first STA includes a useful information subfield (data-R2 w/o support) and padding (padding) subfields.

The second data field of the PPDU transmitted on the second resource unit allocated to the second STA includes data subfields (data-R2 w/support) and a plurality of midamble (midamble) subfields. The plurality of midamble subfields are interspersed in the data subfields.

A third data field of the PPDU transmitted on a third resource unit allocated to the third STA includes data subfields (data R2 w/support) and a plurality of midamble subfields. The plurality of midamble subfields are interspersed in the data subfields.

A fourth data field of the PPDU transmitted on a fourth resource unit allocated to the fourth STA includes data subfields (data-HE) and a plurality of midamble (midamble-HE) subfields. The plurality of midamble subfields are interspersed in the data subfields.

In this way, the AP may simultaneously transmit the PPDU to a STA that does not support receiving a midamble and a plurality of STAs that support receiving a midamble, thereby effectively saving resources.

In a schematic diagram of structures of a PPDU shown in FIG. 9B, a symbol that corresponds to the midamble subfield transmitted on the second resource unit and that is in the first resource unit may be also used to transmit the midamble subfield. In other words, the first data field may also include a midamble subfield, and a time domain position of the midamble subfield is the same as a time domain position of the midamble subfield in the second data field. In this way, when the AP simultaneously sends the PPDU to the plurality of STAs, the low peak-to-average power ratio (peak-to-average power ratio, PAPR) is ensured, and interference to the another PPDU can also be reduced.

In a schematic diagram of structures of a PPDU shown in FIG. 9C, the first data field transmitted on the first resource unit may include only a useful information subfield, and does not include a padding subfield or a midamble subfield. In other words, the first data field of the PPDU sent to the first STA may carry only useful information. In this way, the first data field transmitted on the first resource unit may transmit more useful information.

It should be understood that, in any one of embodiments corresponding to FIG. 8A to FIG. 9C, the AP may send the PPDU to only a device that does not support a midamble and a device that supports a midamble. For example, the AP may send the PPDU to only the first STA, the second STA, and the third STA, or the AP may send the PPDU to only the first STA and the fourth STA.

In some optional embodiments, the PPDU further includes the U-SIG. The U-SIG includes a midamble indication subfield, and the midamble indication subfield indicates that the data field of the PPDU includes the midamble subfield. Optionally, the midamble indication subfield may also be referred to as a Doppler indication subfield. A name of the field is not limited in this application.

For example, for the first-type first STA, at least one disregard bit in the U-SIG may be used to carry the midamble indication subfield. In other words, the at least one disregard bit in the U-SIG may be used as the midamble indication subfield. In this way, when reading the disregard bit, the first-type first STA directly ignores the disregard bit. Escape of the disregard bit indicates the midamble, so that the first-type STA can normally receive the data field.

For another example, for the second-type first STA, the at least one disregard bit in the U-SIG may be used to carry the midamble indication subfield, or at least one validate bit in the U-SIG may be used to carry the midamble indication subfield. In other words, the at least one disregard bit or at least one validate bit in the U-SIG may be used as the midamble indication subfield. It may be understood that the second-type first STA can understand the disregard bit and the validate bit. Therefore, when the disregard bit or the validate bit is used to carry the midamble indication subfield, the first STA that receives the PPDU can understand a meaning indicated by the midamble indication subfield. Therefore, the first STA can accurately receive the useful information subfield in the data field, to obtain the useful information.

Optionally, if the disregard bit is used to carry the midamble indication subfield, the AP may simultaneously transmit the PPDU to the first-type STA, the second-type STA, and the second STA. This can better improve resource utilization efficiency.

Further, the PPDU further includes the EHT-SIG. The U-SIG or the EHT-SIG includes a midamble periodicity indication subfield, and the midamble periodicity indication subfield indicates a periodicity of the midamble.

In this embodiment of this application, for a case in which the first STA is the first-type STA and a case in which the first STA is the second-type STA, several implementations in which the midamble subfield indicates the periodicity of the midamble are separately provided.

When the first STA is the first-type first STA, in a possible implementation, the at least one disregard bit may indicate the periodicity of the midamble. It should be understood that the U-SIG includes a plurality of disregard bits. At least one bit (for example, one bit) in the plurality of disregard bits may be used as the midamble indication subfield to indicate that the PPDU includes the midamble subfield, and at least one another bit (for example, one bit) in the plurality of disregard bits may be used as the midamble periodicity subfield to indicate the periodicity of the midamble.

When the first STA is the first-type first STA, in a possible implementation, in a non-multiple-user multiple-input multiple-output (multiple-user multiple-input multiple-output, MU-MIMO) scenario, at least one bit in a number of space-time streams (number of space-time streams, NSS) subfield in a user field may be used as the midamble periodicity subfield to indicate the periodicity of the midamble.

Specifically, when the midamble indication subfield indicates that the PPDU does not include the midamble subfield, or when the Doppler subfield indicates that the PPDU does not include the midamble subfield, for example, when the midamble indication subfield indicates a second value (for example, 0), the number of space-time streams subfield normally indicates a number of space-time streams. When the midamble indication subfield indicates that the PPDU includes the midamble subfield, or when the Doppler subfield indicates that the PPDU includes the midamble subfield, for example, when the midamble indication subfield indicates a first value (for example, 1), the number of space-time streams subfield normally indicates the number of space-time streams, and the at least one bit in the number of space-time streams subfield in the user field is used as the midamble periodicity subfield to indicate the periodicity of the midamble. For example, if the number of space-time streams subfield is 4 bits, and the midamble indication subfield indicates that the PPDU includes the midamble subfield, 3 bits of the 4 bits indicate the number of spatial streams, and the other one bit is used as the midamble periodicity subfield to indicate the periodicity of the midamble.

When the first STA is the second-type STA, an implementation in which the midamble subfield indicates periodicity of the midamble may be any implementation in which the midamble subfield indicates the periodicity of the midamble when the first STA is the first-type STA.

The following further provides several implementations in which the midamble subfield indicates the periodicity of the midamble when the first STA is the second-type STA.

In a possible implementation, the at least one validate bit may indicate the periodicity of the midamble. It should be understood that the U-SIG includes a plurality of disregard bits and a plurality of validate bits. At least one bit in the plurality of disregard bits and the plurality of validate bits may be used as the midamble indication subfield to indicate that the PPDU includes the midamble subfield, and at least one another bit in the plurality of disregard bits and the plurality of validate bits may be used as the midamble periodicity subfield to indicate the periodicity of the midamble.

Specifically, when the first STA is the second-type STA, the at least one bit in the plurality of disregard bits and the plurality of validate bits may be used as the midamble indication subfield to indicate that the PPDU includes the midamble subfield, and the at least one another bit (for example, one bit) in the plurality of disregard bits and the plurality of validate bits may be used as the midamble indication subfield to indicate that the PPDU includes the midamble subfield.

In another possible implementation, in the non-multiple-user multiple-input multiple-output (multiple-user multiple-input multiple-output, MU-MIMO) scenario, at least one bit (for example, one bit) in a number of EHT-LTF symbols (number of EHT-LTF symbols) subfield in the U-SIG may be used as the midamble periodicity subfield to indicate the periodicity of the midamble.

Specifically, when the midamble indication subfield indicates that the PPDU does not include the midamble subfield, or when the Doppler subfield indicates that the PPDU does not include the midamble subfield, for example, when the midamble indication subfield indicates the second value (for example, 0), the number of EHT-LTF symbols subfield normally indicates a number of EHT-LTF symbols. When the midamble indication subfield indicates that the PPDU includes the midamble subfield, or when the Doppler subfield indicates that the PPDU includes the midamble subfield, for example, when the midamble indication subfield indicates the first value (for example, 1), the at least one bit in the number of EHT-LTF symbols subfield is used as the midamble periodicity subfield to indicate the periodicity of the midamble. For example, if the number of EHT-LTF symbols subfield is 3 bits, and the midamble indication subfield indicates that the PPDU includes the midamble subfield, 2 bits of the 3 bits indicate the number of EHT-LTF symbols, and the other 1 bit is used as the midamble periodicity subfield to indicate the periodicity of the midamble.

In some optional embodiments, the periodicity of the midamble subfield may be specified by a standard. For example, it may be specified that the periodicity of the midamble subfield is 20 OFDM symbols. In this way, the PPDU may not include the midamble periodicity indication subfield. In this way, a bit originally used to carry the midamble periodicity indication subfield may be used to carry other information, so that the PPDU can carry more information.

The following describes an implementation in which the first STA and the second STA each receive the data field of the PPDU, and obtain the useful information in the data field.

In some embodiments, the first STA is the first-type STA. As shown in a schematic flowchart shown in FIG. 7B, step 703 may include the following step 7031 and step 7032. In other words, a specific process in which the first STA obtains the useful data information in the data field may include the following step 7031 or step 7032.

7031: When it is identified that a value of the midamble indication subfield in the U-SIG is the first value, the first STA ignores the midamble indication subfield.

The first value may be, for example, a default value of 1.

In this embodiment of this application, that the midamble indication subfield indicates that the data field includes the midamble subfield is implemented through escape indication of the disregard bit. When the first STA is the first-type STA, the first STA is not capable of understanding the disregard bit. In this case, the first STA still ignores the subfield based on an original meaning of the disregard bit, and then continues to receive the PPDU. Because the first-type STA cannot actually read the meaning indicated by the midamble indication subfield, and cannot obtain information about whether the data field includes the midamble subfield, the first-type STA cannot obtain information about the periodicity of the midamble.

7032: The first STA obtains and parses the useful information subfield, to obtain the useful data information.

After ignoring the midamble indication subfield, the first STA continues to receive the PPDU and decodes the first data field when receiving the first data field transmitted on the first resource unit, to obtain the useful data information in the first data field.

Specifically, when receiving the first data field, the first STA obtains the useful data information from an A-MPDU pre-EOF padding part (the useful information subfield) of an A-MPDU subfield. When an EOF delimiter is read, it is determined that the A-MPDU pre-EOF padding part ends, and information that is read before the EOF delimiter and after a service subfield is the useful data information.

It can be learned that, in the technical solutions of this application, when the first STA that receives the PPDU is the first-type STA, the first STA can also normally receive the data field, and obtain useful data information in the data field.

In some other embodiments, the first STA is the second-type STA. As shown in a schematic flowchart shown in FIG. 7C, step 703 may include the following step 7033 and step 7034. In other words, a specific process in which the first STA obtains the useful data information in the first data field may include the following step 7031 or step 70032.

7033: When it is identified that a value of the midamble indication subfield in the U-SIG is the first value, the first STA determines that the first data field includes the midamble subfield.

The first value may be, for example, a default value of 1.

In this embodiment of this application, that the midamble indication subfield indicates that the data field includes the midamble subfield is implemented through escape indication of the disregard bit or the validate bit. When the first STA is the second-type STA, the first STA is capable of understanding the disregard bit and the validate bit. The first STA can accurately understand the meaning indicated by the midamble indication subfield, and determine that the data field includes the midamble subfield.

7034: The first STA obtains the periodicity of the midamble based on the midamble periodicity indication subfield.

After determining that the first data field includes the midamble, the first STA may continue to obtain the periodicity of the midamble based on the midamble periodicity indication subfield.

For example, that the midamble periodicity indication subfield indicates the periodicity of the midamble is implemented through escape indication of the disregard bit or the validate bit, or the periodicity of the midamble is indicated by using the disregard bit or the validate bit. In this case, the first STA can accurately read the disregard bit and the validate bit, so that the first STA can accurately read the meaning indicated by the midamble indication subfield, and obtain the periodicity of the midamble subfield.

For another example, that the midamble periodicity indication subfield indicates the periodicity of the midamble is implemented through escape indication of at least one bit in an NSS subfield, in other words, the periodicity of the midamble is indicated by using the at least one bit in the NSS subfield. In this case, when determining, based on the midamble indication subfield, that the data field includes the midamble subfield, the first STA can determine that the at least one bit in the NSS subfield indicates the periodicity of the midamble. Therefore, the periodicity of the midamble can be obtained based on the at least one bit in the NSS subfield.

For still another example, that the midamble periodicity indication subfield indicates the periodicity of the midamble is implemented through escape indication of at least one bit in a number of EHT-LTF symbols subfield, in other words, the periodicity of the midamble is indicated by using the at least one bit in the number of EHT-LTF symbols subfield. In this case, when determining, based on the midamble indication subfield, that the data field includes the midamble subfield, the first STA can determine that the at least one bit in the number of EHT-LTF symbols subfield indicates the periodicity of the midamble. Therefore, the periodicity of the midamble can be obtained based on the at least one bit in the number of EHT-LTF symbols subfield.

7035: The first STA obtains, based on the periodicity of the midamble, the useful information subfield located before a first midamble subfield in one or more midamble subfields.

The first STA may determine, based on the periodicity of the midamble, a location at which the midamble subfield appears, to obtain the useful information field in the data field. In this way, the first STA can be prevented from mistaking a field after the first OFDM symbol corresponding to the midamble subfield as the useful information subfield, and accuracy of the useful data information obtained by the first STA can be ensured.

7036: The first STA obtains and parses the useful information subfield, to obtain the useful data information.

For a specific implementation of step 7036, refer to related descriptions of step 7032 in the foregoing embodiment. Details are not described herein again.

It can be learned that when the first STA is the second-type STA, (for example, a STA that does not support receiving a midamble and support 802.11be R2), although the first STA cannot estimate the channel based on the midamble subfield, the first STA can understand the midamble indication subfield, and can also correctly read the midamble periodicity indication subfield, to obtain the periodicity of the midamble, and to accurately obtain the useful information subfield before the first OFDM symbol corresponding to the midamble.

In some embodiments, the second STA is a STA that supports receiving the midamble and can understand a field related to the midamble (for example, a STA that supports receiving the midamble and supports 802.11be R2). The data field of the PPDU includes the data subfield and the midamble subfield. As shown in a schematic flowchart shown in FIG. 7D, a process in which the second STA receives the PPDU may include the following step 7041 to step 7043.

7041: When it is identified that a value of the midamble indication subfield in the U-SIG is the first value, the second STA determines that the second data field includes the midamble subfield.

The first value may be, for example, a default value of 1.

That the midamble indication subfield indicates that the second data field includes the midamble subfield is implemented through escape indication of the disregard bit or the validate bit. The second STA is capable of understanding the disregard bit and the validate bit. The second STA can accurately understand the meaning indicated by the midamble indication subfield, and determine that the data field includes the midamble subfield.

7042: The second STA obtains the periodicity of the midamble based on the midamble periodicity indication subfield.

After determining that the data field includes the midamble subfield, the second STA may continue to obtain the periodicity of the midamble based on the midamble periodicity indication subfield.

For example, that the midamble periodicity indication subfield indicates the periodicity of the midamble is implemented through escape indication of the disregard bit or the validate bit, or the periodicity of the midamble is indicated by using the disregard bit or the validate bit. In this case, the first STA can accurately read the disregard bit and the validate bit, so that the first STA can accurately read the meaning indicated by the midamble indication subfield, and obtain the periodicity of the midamble subfield.

For another example, that the midamble periodicity indication subfield indicates the periodicity of the midamble is implemented through escape indication of at least one bit in an NSS subfield, in other words, the periodicity of the midamble is indicated by using the at least one bit in the NSS subfield. In this case, when determining, based on the midamble indication subfield, that the data field includes the midamble subfield, the first STA can determine that the at least one bit in the NSS subfield indicates the periodicity of the midamble. Therefore, the periodicity of the midamble can be obtained based on the at least one bit in the NSS subfield.

For still another example, that the midamble periodicity indication subfield indicates the periodicity of the midamble is implemented through escape indication of at least one bit in a number of EHT-LTF symbols subfield, in other words, the periodicity of the midamble is indicated by using the at least one bit in the number of EHT-LTF symbols subfield. In this case, when determining, based on the midamble indication subfield, that the data field includes the midamble subfield, the first STA can determine that the at least one bit in the number of EHT-LTF symbols subfield indicates the periodicity of the midamble. Therefore, the periodicity of the midamble can be obtained based on the at least one bit in the number of EHT-LTF symbols subfield.

7043: The second STA obtains and parses the data subfield based on the periodicity of the midamble.

The second STA can determine a location of the midamble subfield in the data field based on the periodicity of the midamble, to determine a location of the data subfield, so as to accurately receive and parse the data subfield.

Specifically, the second data field may include one or more midamble subfields. The one or more midamble subfields are interspersed in the data subfield.

When receiving the second data field, the second STA first receives a data subfield before a first midamble subfield, then receives the first midamble subfield, and performs channel measurement based on the first midamble subfield. The second STA receives, based on a channel measurement result, a data subfield after the first midamble subfield and before a second midamble subfield, then receives the second midamble subfield, and performs channel measurement based on the second midamble subfield. The second STA receives, based on a channel measurement result, a data subfield after the second midamble subfield and before a third midamble subfield. Remaining data subfields are received by analogy.

In this way, in a process of receiving the data subfields, the second STA measures the channel based on the interspersed midamble subfields, so that channel information can be obtained more accurately, and the data subfields can be received more accurately.

Figure 7B:
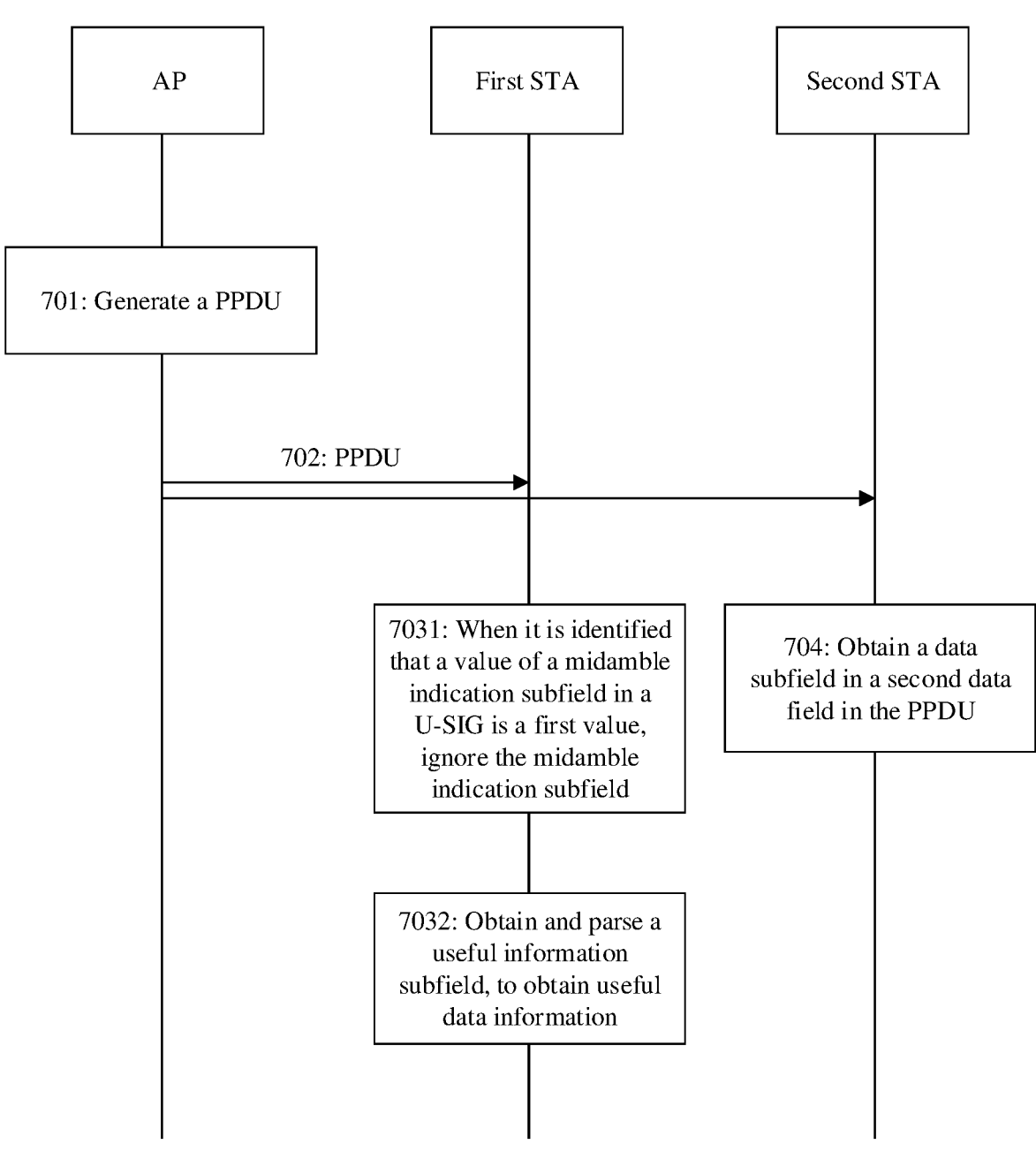
FIG. 7B is another schematic flowchart of a PPDU transmission method according to an embodiment of this application.
Figure 7C:
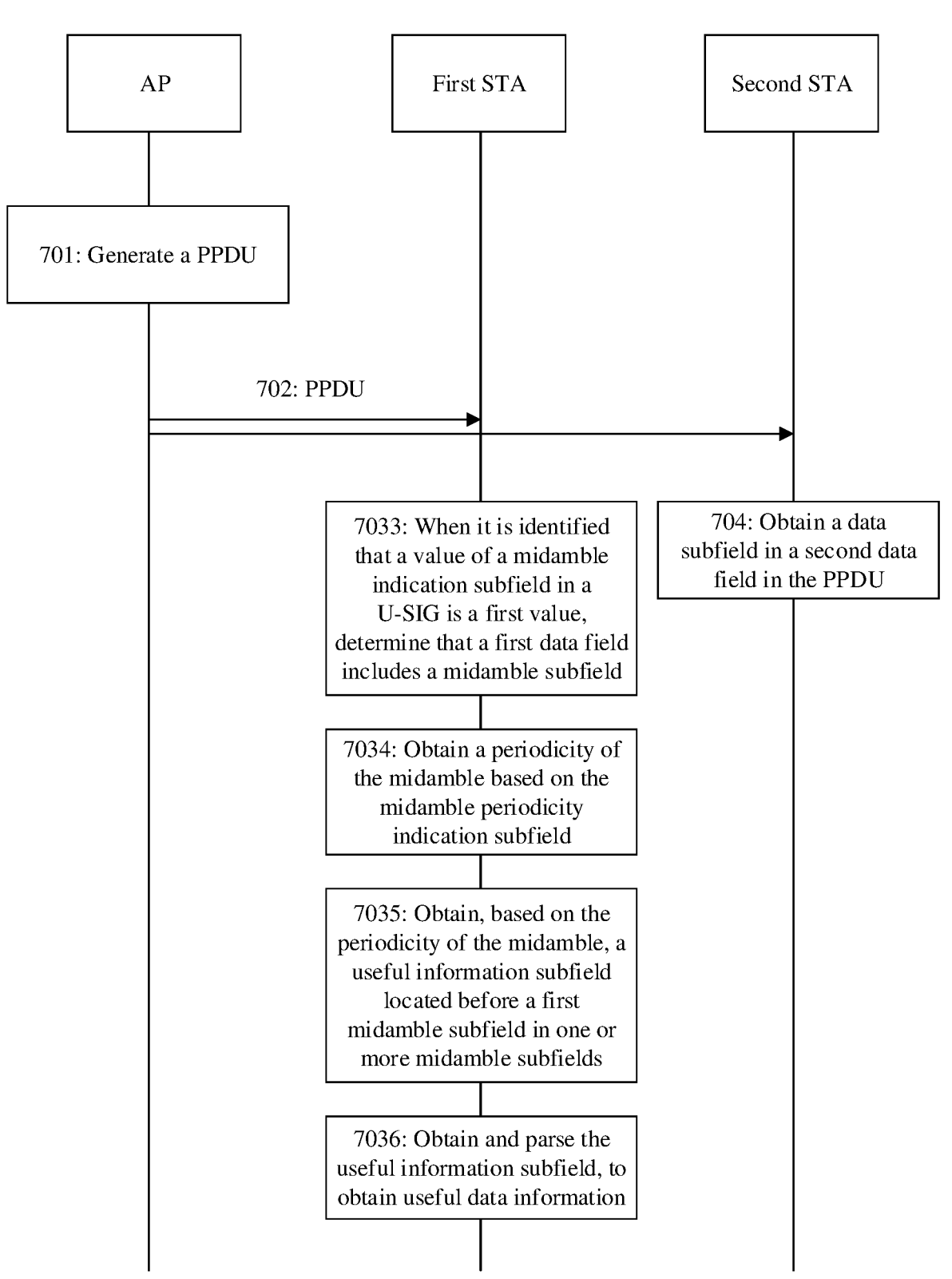
FIG. 7C is another schematic flowchart of a PPDU transmission method according to an embodiment of this application.
Figure 7D:
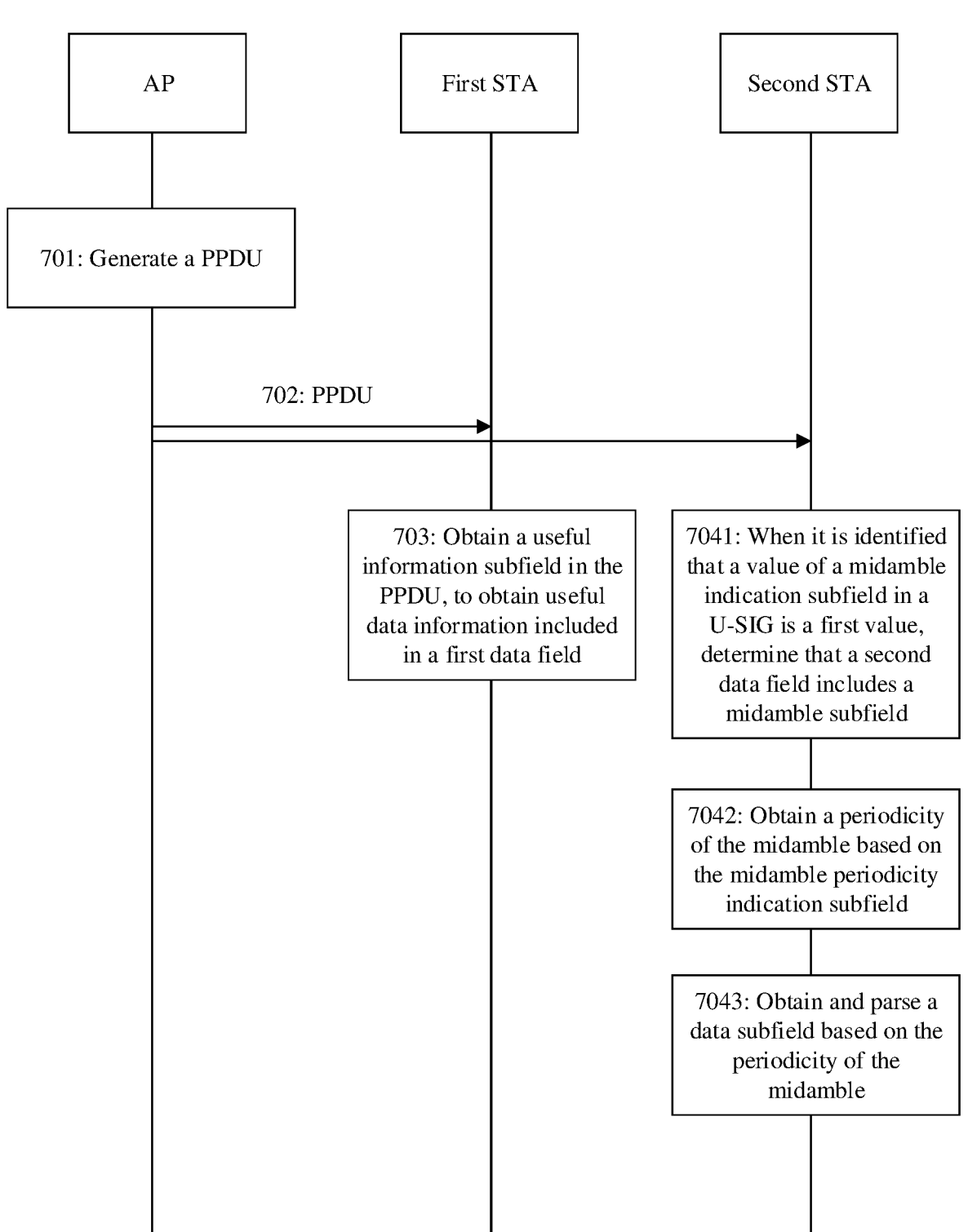
FIG. 7D is another schematic flowchart of a PPDU transmission method according to an embodiment of this application.

It should be understood that the embodiment corresponding to FIG. 7D may be implemented independently, or may be implemented in combination with the embodiment corresponding to FIG. 7B or FIG. 7C.

The following describes a specific solution in which the useful information subfield is located before the OFDM symbol corresponding to the midamble subfield when the AP encodes the data field regarding the data field to be sent to the first STA.

When sending the data field of the PPDU, the AP performs scrambling and encoding after adding a tail bit (tail bit) and pre-FEC padding (pre-FEC padding) to the field before coding. Then, the midamble subfield is inserted based on the periodicity of the midamble, to obtain the data field. A device (for example, a STA) that receives the PPDU performs channel estimation based on the midamble subfield, to update the channel information. The device that receives the PPDU decodes parts of the data field other than the midamble subfield during decoding. In other words, the device that receives the PPDU first removes the midamble subfield from the data field, and then decodes the remaining parts of the data field.

Generally, the data field is coded through low density parity check (low density parity check, LDPC) coding or binary convolutional code (binary convolutional code, BCC) coding. If an LDPC code is used for coding, a code length and a quantity of codewords of the LDPC code need to be determined based on a number of bits (number of available bits) after the data field is coded.

If the first STA is the first-type STA, when receiving the PPDU, the first STA considers all OFDM symbols after an EHT-LTF field and before the PE field as the data field. When the AP generates the PPDU, to ensure that lengths of PPDUs sent to all STAs are the same, when adding the pre-FEC padding (pre-FEC padding) to the data field, a length of the midamble need to be considered.

In some embodiments, the data field is coded through the LDPC, and a codeword carrying the useful information ends before the first midamble subfield. In this way, it can be ensured that the first STA can correctly decode the data field to obtain the useful information, and a Doppler effect caused by an excessively long useful information subfield can be prevented from severely affecting accuracy of receiving the data field.

In some other embodiments, the data field is coded by using the BCC, and a number of symbols in the useful information subfield carrying the useful information is less than the periodicity of the midamble.

Specifically, the following describes in detail a process of adding the pre-FEC padding in the data field of the PPDU sent by the AP to the first STA when the AP sends the PPDU to the plurality of STAs, where the plurality of STAs include the first STA and the second STA, and the first STA is the first-type STA, including the following steps.

1: Calculate an initial number $N_{SYM,init,u}$ of symbols and an initial pre-FEC padding parameter $a_{init,u}$ coded in the data field of the PPDU sent by the AP to each STA. The subscript u=0, 1, . . . , $N_{PPDU,total}-1$. $N_{PPDU,total}$ indicates a total number of PPDUs sent by the AP. In this embodiment of this application, an example in which the PPDU does not use space time block code (space time block code, STBC) is used for description.

2: If receive end devices include a plurality of STAs that support receiving a midamble, determine an index of a PPDU with longest duration $N_{SYM,init,u_{max}}$ of coding a data packet in one or more PPDUs that include a midamble, obtain initial quantities $N_{SYM,init}$ of symbols and initial pre-FEC padding parameters $a_{init}$ of all PPDUs that include a midamble.

$$N_{SYM,init} = N_{SYM,init,u_{max}};$$

$$u_{max} = \text{argmax}_{u=0}^{N_{PPDU,total}-1}\left(N_{SYM,init,u} - 1 + \frac{a_{init,u}}{4}\right); \text{ and}$$

$$a_{init} = a_{init,u_{max}}.$$

3: Calculate final numbers of symbols and pre-FEC padding parameters of data fields in the PPDUs that include the midamble.

If a data field in the data fields of the PPDU sent to the plurality of STAs is coded by using the LDPC code, a number of punctured bits that are required for coding and that are obtained through calculation is excessively large, and a length of a bit obtained through coding needs to be extended to ensure error correction performance. In this case, an LDPC extra symbol segment field in an EHT-SIG or an HE-SIG-A field in the PPDU (including a PPDU sent to an R1 device) sent to each STA needs to be set to 1, and the number of symbols and the pre-FEC padding parameter $a_{init}$ are updated as follows:

$$\begin{cases} N_{SYM} = N_{SYM,init} + 1 \text{ and } a = 1, \text{ if } a_{init} = 4 \\ N_{SYM} = N_{SYM,init} \text{ and } a = a_{init} + 1, \text{ otherwise} \end{cases}$$

If the data field sent to the first STA is coded through the LDPC, the LDPC extra symbol segment field in the EHT-SIG or the HE-SIG-A field in each PPDU is set to 1, and the number of symbols and the pre-FEC padding parameter $a_{init}$ are updated as follows:

$$\begin{cases} N_{SYM} = N_{SYM,init} + 1 \text{ and } a = 1, \text{ if } a_{init} = 4 \\ N_{SYM} = N_{SYM,init} \text{ and } a = a_{init} + 1, \text{ otherwise} \end{cases}$$

If the length of the bit obtained through coding does not need to be extended based on a calculation result, and a data field in the PPDU sent to the R1 device is coded by using a BCC, the LDPC extra symbol segment field in the EHT-SIG or the HE-SIG-A field in each PPDU is set to 0, and the number of symbols and the pre-FEC padding parameter $a_{init}$ are updated as follows:

$$N_{SYM}=N_{SYM,init} \text{ and } a=a_{init}.$$

A pre-FEC padding field in the EHT-SIG or the HE-SIG-A field is set to a value a.

If the length of the bit obtained through coding does not need to be extended based on a calculation result, and a data field in the PPDU sent to the R1 device is coded by using a BCC, the LDPC extra symbol segment field in the EHT-SIG or the HE-SIG-A field in each PPDU is set to 0, and the number of symbols and the pre-FEC padding parameter $a_{init}$ are updated as follows:

$$N_{SYM}=N_{SYM,init} \text{ and } a=a_{init}.$$

A pre-FEC padding field in the EHT-SIG or the HE-SIG-A field is set to a value a.

4: Calculate a number $N_{MA}$ of periodicities inserted in the midamble subfield, and calculate a number $N_{SYM,R1}$ of symbols and a pre-FEC padding parameter $a_{init}$ of the data field in the PPDU sent to the first STA:

$$N_{MA} = \max\left(0, \left\lceil \frac{N_{SYM}-1}{M_{MA}} \right\rceil - 1\right);$$

-continued $$N_{SYM,R1} = N_{SYM} + N_{MA} \cdot N_{EHT-LTF};\ and$$

$$a_{R1} = a.$$

$N_{EHT-LTF}$ indicates a number of 4× symbols in the EHT-LTF field.

5: If the data field is coded by using the BCC, a number of symbols of the field (the useful information subfield) carrying the useful information need to satisfy:

$$N_{SYM,info} = \left\lceil \frac{8 \cdot \text{APEP\_LENGTH} + N_{tail(BC} + N_{service16}}{N_{DBPS}} \right\rceil \le M_{MA}.$$

APEP_LENGTH is a parameter APEP_LENGTH in TXVECTOR, and indicates a number of bytes of the useful information subfield. $M_{MA}$ is a quantity of symbols of the periodicity in the midamble subfield. $N_{DBPS}$ is a number of data bits included in each symbol. $N_{service}$ is a number of bits of a service subfield in the PPDU, and a value is a constant 16. $N_{tail}$ indicates a number of tail bits, and exists only in the BCC.

A restriction on the number of bytes of the useful information subfield is as follows:

$$\text{APEP\_LENGTH} \le \frac{1}{8}(M_{MA} \cdot N_{DBPS} - N_{tail} - N_{service}).$$

6: If the data field is coded through the LDPC, first determine the code length $L_{LDPC}$ of the LDPC code and a total of required codewords $N_{CW}$ based on a data bit length $N_{pld}$ and a number $N_{avbits}$ of bits that can be transmitted.

$$N_{pld} = (N_{SYM,init} + N_{MA} \cdot N_{EHT-LTF} - 1) \cdot N_{DBPS} + N_{DBPS,last},$$
and $$N_{avbits} = (N_{SYM,R1} - 1) \cdot N_{CBPS} + N_{CBPS,last};$$

where $N_{CBPS} = N_{DBPS}/R$ indicates a number of coded bits included in each symbol, and R is a bit rate; and $N_{DBPS,last}$ and $N_{CBPS,last}$ indicate a number of data bits and a number of coded bits in a last symbol.

Coding parameters of the PPDU are shown in Table 2.

TABLE 2

| $N_{avbits}$ range (number of bits) | Quantity $N_{CW}$ of codewords of the LDPC code | Code length $L_{LDPC}$ of the LDPC code (number of bits) |
|---|---|---|
| $N_{avbits} \le 648$ | 1 | 1296, if $N_{avbits} \ge N_{pld} + 912 \times (1 - R)$ 648, otherwise (otherwise) |
| $648 < N_{avbits} \le 1296$ | 1 | 1944, if $N_{avbits} \ge N_{pld} + 1464 \times (1 - R)$ 1296, otherwise (otherwise) |
| $1296 < N_{avbits} \le 1944$ | 1 | 1944 |
| $1944 < N_{avbits} \le 2592$ | 2 | 1944, if $N_{avbits} \ge N_{pld} + 2916 \times (1 - R)$ 1296, otherwise (otherwise) |
| $2592 < N_{avbits}$ | $\left\lceil \dfrac{N_{pld}}{1944 \cdot R} \right\rceil$ | 1944 |

After the LDPC code is shortened (shortened), punctured (shortened), or repeated (shortened), a code length $L_{LDPC,avbits}$ of each codeword finally obtained satisfies $$\left\lfloor \frac{N_{avbits}}{N_{CW}} \right\rfloor \le L_{LDPC,avbits} \le \left\lceil \frac{N_{avbits}}{N_{CW}} \right\rceil.$$

In this way, it can be ensured that the code length after coding cannot exceed a last symbol of the periodicity, and the useful information subfield can be included. In order to consider an extreme case, it is assumed that an upper limit of all codewords is $$N_{LDPC} = \left\lceil \frac{N_{avbits}}{N_{CW}} \right\rceil,$$

and a number $L_{LDPC,pld}$ of data bits included in each codeword satisfies $$\left\lfloor \frac{N_{pld}}{N_{CW}} \right\rfloor \le L_{LDPC,pld} \le \left\lceil \frac{N_{pld}}{N_{CW}} \right\rceil.$$

Because a header codeword is shortened by one more bit, it is assumed that a lower limit of all codewords is $$L_{LDPC,pld} = \left\lfloor \frac{N_{pld}}{N_{CW}} \right\rfloor.$$

To ensure correct decoding of the STA at the receive end, a number $N_{avbits,info}$ of encoded bits included in the codeword carrying the useful information needs to satisfy: $N_{avbits,info} \le N_{CW,info} \cdot L_{LDPC,avbits} \le M_{MA} N_{CBPS}$.

$$N_{CW,info} = \left\lceil \frac{8 \cdot \text{APEP\_LENGTH} + N_{service}}{L_{LDPC,pld}} \right\rceil$$

indicates a quantity of codewords carrying the useful information.

A restriction on a number of bytes of the useful information finally obtained is as follows:

$$\text{APEP\_LENGTH} \le \frac{1}{8}\left( M_{MA} \cdot N_{DBPS} \cdot \frac{R \cdot L_{LDPC,pld}}{L_{LDPC,avbits}} - N_{service} \right).$$

7: Calculate a length of the pre-FEC padding of the PPDU sent to the first STA:

$$N_{PAD,Pre-FEC} = (N_{SYM,R1} - 1) \cdot N_{DBPS} + N_{DBPS,last} - 8 \cdot \text{APEP\_LENGTH} - N_{service} - N_{tail},\ \text{where}$$

$N_{DBPS,last}$ indicates the number of data bits in the last symbol, and is determined by a pre-FEC padding factor $\alpha$ and $N_{DBPS}$.

8: Add the following pre-FEC padding bits to a MAC layer and a PHY layer respectively:

$$N_{PAD,Pre-FEC,MAC} = \left\lfloor \frac{N_{PAD,Pre-FEC}}{8} \right\rfloor \cdot 8,\ \text{and}$$

$$N_{PAD,Pre-FEC,PHY} = N_{PAD,Pre-FEC}\ \text{mod}\ 8.$$

After reading the EOF delimiter in the A-MPDU of the data field, the first-type first STA determines a length of the useful information subfield, and ignores a remaining padding (padding) subfield.

Optionally, in this embodiment of this application, when the first STA is the first-type STA, a midamble subfield in the data field of the PPDU sent to the second STA is 4×EHT-LTF. In this way, when receiving the data field, the first STA can be prevented from continuing to demodulate information in the data field starting from after the OFDM symbol corresponding to the midamble subfield, thereby avoiding misreading.

If the first STA is the second-type STA, the first STA can understand the midamble indication subfield, and can also obtain the periodicity of the midamble. If the first STA is not capable of removing the midamble subfield from the data field and then performing decoding when receiving the data field, a process of adding the pre-FEC padding in the data field of the PPDU sent by the AP to the first STA when the first STA is the second-type STA may be the same as the process of adding the pre-FEC padding in the data field of the PPDU sent by the AP to the first STA when the first STA is the first-type STA. If the first STA is capable of removing the midamble subfield from the data field and then performing decoding, but cannot measure the channel based on the midamble subfield, a structure of the data field of the PPDU sent by the AP to the first STA may be the same as a structure of the data field of the PPDU sent by the AP to the second STA.

Figure 10:
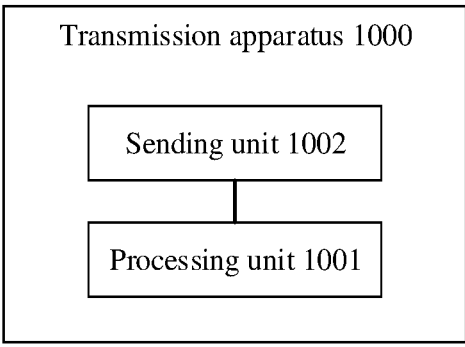
FIG. 10 is a schematic diagram of a structure of a PPDU transmission apparatus according to an embodiment of this application.

In a schematic diagram of a structure shown in FIG. 10, an embodiment of this application provides a PPDU transmission apparatus. The transmission apparatus may be used as a PPDU transmit end device or deployed on a PPDU transmit end device. The transmit end device may be an access point, or may be a station. A transmission apparatus 1000 includes:

a processing unit 1001, configured to generate a physical layer protocol data unit PPDU, where the PPDU includes a data field; and a sending unit 1002, configured to send the PPDU to a first station and a second station, where the first station is a station that does not support receiving a midamble, and the second station is a station that supports receiving the midamble.

A second data field transmitted on a second resource unit allocated to the second station includes a midamble subfield. A first data field transmitted on a first resource unit allocated to the first station includes a useful information subfield, and the useful information subfield includes useful data information.

The Useful Information Subfield Meets at Least One of the Following Conditions:

the useful information subfield is located before a first OFDM symbol corresponding to the midamble subfield;

the first data field further includes a padding subfield, and a start location of the padding subfield is before a first OFDM symbol corresponding to the midamble subfield; or the first data field further includes a padding subfield, and a start location of the padding subfield is not later than a first OFDM symbol corresponding to the midamble subfield.

According to the technical solution in this embodiment of this application, in a Doppler scenario, a transmit end sends the PPDU to both the first station that does not support receiving the midamble and the second station that supports receiving the midamble. In addition, the useful information subfield in the first data field received by the first station that does not support receiving the midamble is located before the first OFDM symbol corresponding to the midamble subfield. In this way, resource utilization efficiency can be improved, and an error in reading the data field in the Doppler scenario because an excessively long useful information part carried in the first data field and the first station cannot estimate a channel in real time based on the midamble can also be avoided. This helps the first station that does not support receiving the midamble accurately obtain the useful data information in the data field.

In some implementations, the PPDU further includes a universal signal field U-SIG. The U-SIG includes a midamble indication subfield, and the midamble indication subfield indicates that the data field of the PPDU includes the midamble subfield. The midamble indication subfield may also be referred to as a Doppler indication subfield. A name of the field is not limited in this application.

For example, for a first-type station, at least one disregard bit in the U-SIG may be used to carry the midamble indication subfield. In other words, the at least one disregard bit in the U-SIG may be used as the midamble indication subfield. In this way, when reading the disregard bit, the first-type first station directly ignores the disregard bit. Escape of the disregard bit indicates the midamble, so that the first-type station can normally receive the data field.

For another example, for a second-type station, at least one disregard bit in the U-SIG may be used to carry the midamble indication subfield, or at least one validate bit in the U-SIG may be used to carry the midamble indication subfield. In other words, the at least one disregard bit or at least one validate bit in the U-SIG may be used as the midamble indication subfield. It may be understood that the second-type station can understand the disregard bit and the validate bit. Therefore, when the bit or the validate bit is used to carry the midamble indication subfield, the first station that receives the PPDU can understand a meaning indicated by the midamble indication subfield. Therefore, the first station can accurately receive the useful information subfield in the data field, to obtain the useful information.

The second station can determine, based on the midamble indication subfield, whether the midamble subfield exists in the data field, so that the data field can be read more accurately.

In some implementations, the PPDU further includes an extremely high throughput signal field EHT-SIG. The U-SIG or the EHT-SIG includes a midamble periodicity subfield, and the midamble periodicity indication subfield indicates a periodicity of the midamble. In this way, the second station can obtain a periodicity of the midamble subfield based on the midamble periodicity indication subfield, and obtain a location of the midamble subfield in the data field. Therefore, a part other than the midamble subfield can be accurately read from the data field, to obtain the useful data information.

When a value of the midamble indication subfield is a first value, the midamble indication subfield indicates that the data field of the PPDU includes the midamble subfield, and the midamble periodicity indication subfield indicates the periodicity of the midamble.

When the value of the midamble indication subfield is a second value, the midamble indication subfield indicates that the data field of the PPDU does not include the midamble subfield, and the midamble periodicity indication subfield indicates a number of spatial streams, a number of extremely high throughput long training field EHT-LTF symbols, disregard (disregard), or validate (validate).

In this way, when the value of the midamble indication subfield is different, fields carried in a same bit can indicate different meanings, thereby making full use of transmission resources, and improving transmission resource utilization efficiency.

Figure 11:
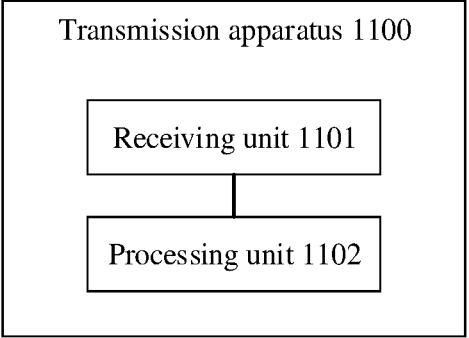
FIG. 11 is a schematic diagram of a structure of another PPDU transmission apparatus according to an embodiment of this application.

In a schematic diagram of a structure shown in FIG. 11, an embodiment of this application provides a PPDU transmission apparatus. The transmission apparatus may be used as a PPDU receive end device or deployed on a PPDU receive end device. The receive end device may be a station, or may be an access point. The receive end device may be, for example, the first station in the foregoing embodiments. A transmission apparatus 1100 includes:

a receiving unit 1101, configured to receive a PPDU, where the PPDU includes a data field; and a processing unit 1102, configured to parse the PPDU to obtain useful data information.

A Useful Information Subfield Meets at Least One of the Following Conditions:

the useful information subfield is located before a first OFDM symbol corresponding to a midamble subfield;

a first data field further includes a padding subfield, and a start location of the padding subfield is before a first OFDM symbol corresponding to a midamble subfield; or a first data field further includes a padding subfield, and a start location of the padding subfield is not later than a first OFDM symbol corresponding to a midamble subfield.

According to the technical solution in this embodiment of this application, an error in reading the data field in a Doppler scenario because an excessively long useful information part carried in the first data field and a station that does not support receiving a midamble cannot estimate a channel in real time based on the midamble can be avoided. This helps the station that does not support receiving the midamble accurately obtain the useful data information in the data field.

In some implementations, the PPDU further includes a universal signal field U-SIG. The U-SIG includes a midamble indication subfield, and the midamble indication subfield indicates that the data field of the PPDU includes the midamble subfield. The midamble indication subfield may also be referred to as a Doppler indication subfield. A name of the field is not limited in this application. For related descriptions of the midamble indication subfield, refer to the midamble indication subfield provided in the transmission method in the first aspect.

In some implementations, the PPDU further includes an extremely high throughput signal field EHT-SIG. The U-SIG or the EHT-SIG includes a midamble periodicity subfield, and the midamble periodicity indication subfield indicates a periodicity of the midamble. For related descriptions of the midamble periodicity indication subfield, refer to the midamble periodicity indication subfield provided in the transmission method in the first aspect.

In some implementations, the transmission apparatus is a first-type station, or is used for a first-type station. In terms of parsing the PPDU to obtain the useful data information, a processor is specifically configured to: when it is identified that a value of the midamble indication subfield in the U-SIG is a first value, ignore the midamble indication subfield; and obtain and parse the useful information subfield to obtain the useful data information.

That the midamble indication subfield indicates that the data field includes the midamble subfield is implemented through escape indication of a disregard bit. When the first station is the first-type station, the first station is not capable of understanding the disregard bit. In this case, the first station still ignores the subfield based on an original meaning of the disregard bit, and then continues to receive the PPDU and decodes the first data field when receiving the first data field transmitted on a first resource unit, to obtain the useful data information in the first data field.

In some other implementations, the transmission apparatus is a second-type station, or is used for a second-type station. In terms of parsing the PPDU to obtain the useful data information, the processor is specifically configured to: when it is identified that the value of the midamble indication subfield in the U-SIG is the first value, determine that the data field includes the midamble subfield; obtain the periodicity of the midamble based on the midamble periodicity indication subfield; obtain, based on the periodicity of the midamble, the useful information subfield located before the first OFDM symbol corresponding to the midamble subfield; and obtain and parse the useful information subfield to obtain the useful data information.

The midamble indication subfield and the midamble periodicity indication subfield implement indication through escape indication of the disregard bit or escape indication of a validate bit. When the first station is the second-type station, the first station is capable of understanding the disregard bit and the validate bit. The first station can accurately understand meanings indicated by the midamble indication subfield and the midamble periodicity indication subfield, and determine that the data field includes the midamble subfield and the periodicity of the midamble subfield. In this way, the useful information subfield before the first OFDM symbol corresponding to the midamble is accurately obtained.

Figure 12:
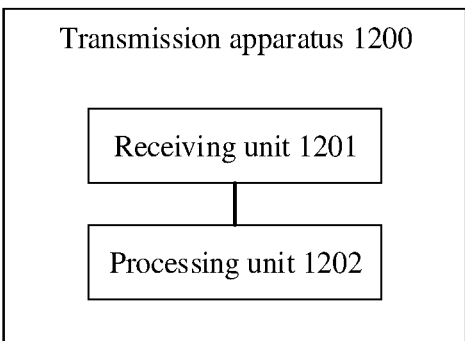
FIG. 12 is a schematic diagram of a structure of still another PPDU transmission apparatus according to an embodiment of this application.

In a schematic diagram of a structure shown in FIG. 12, an embodiment of this application provides a PPDU transmission apparatus. The transmission apparatus may be used as a PPDU receive end device or deployed on a PPDU receive end device. The receive end device may be a station, or may be an access point. The receive end device may be, for example, the second station in the foregoing embodiments. A transmission apparatus 1200 includes:

a receiving unit 1201, configured to receive a PPDU, where the PPDU includes a data field, the data field includes a data subfield and one or more midamble subfields spaced apart, the data subfield is separated into at least two segments by the midamble subfields, and the data subfield includes useful data information; and a processing unit 1202, configured to parse the PPDU to obtain the useful data information.

In such a solution, the midamble subfields are interspersed in the data field, so that when receiving the data field, the receive end device can estimate a channel based on interspersed midambles, and obtain latest channel information in time. Therefore, the receive end device can better receive the data field.

It should be understood that related descriptions in the foregoing embodiments of the PPDU transmission method are also applicable to the PPDU transmission apparatus in embodiments of this application. To avoid redundancy, details are not described herein again.

The receiving unit in the PPDU transmission apparatus may be implemented by using the receiver of the foregoing PPDU transmission apparatus 200, and the sending unit in the PPDU transmission apparatus may be implemented by using the transmitter of the foregoing PPDU transmission apparatus 200. The processing unit in the PPDU transmission apparatus may be implemented by using the processor 201 of the foregoing PPDU transmission apparatus 200.

Although embodiments of this application are mainly described by using a network deployed based on IEEE 802.11 as an example, persons skilled in the art easily understands that various aspects of this application may be extended to other networks using various standards or protocols such as Bluetooth (Bluetooth), a high performance radio LAN (high performance radio LAN, HiperLan) (a wireless standard that is similar to the IEEE 802.11 standard and that is mainly used in Europe), a wide area network (WAN), a wireless local area network (wireless local area network, WLAN), a personal area network (personal area network, PAN), or other networks currently known or later developed. Therefore, the various aspects provided in this application are applicable to any suitable wireless network regardless of coverage and wireless access protocols.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

Persons of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, or deleted based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:
generating a physical layer protocol data unit (PPDU), wherein the PPDU comprises a data field, wherein the data field comprises a first data field and a second data field; and
sending the PPDU to a first station and a second station, wherein the first station does not support receiving a midamble, the second station supports receiving the midamble; and
wherein the second data field is transmitted on a second resource unit allocated to the second station, the second data field comprises a midamble subfield, the first data field is transmitted on a first resource unit allocated to the first station, the first data field comprises a first information subfield, the first information subfield comprises first data information, and the first information subfield is located before a first orthogonal frequency-division multiplexing (OFDM) symbol that corresponds to the midamble subfield; and
wherein the PPDU further comprises a universal signal field (U-SIG), the U-SIG comprises a midamble indication subfield, and the midamble indication subfield indicates that the data field of the PPDU comprises the midamble subfield.

2. The method according to claim 1, wherein the PPDU further comprises an extremely high throughput signal field (EHT-SIG), the U-SIG or the EHT-SIG comprises a midamble periodicity indication subfield, and the midamble periodicity indication subfield indicates a periodicity of the midamble.

3. The method according to claim 2, wherein:

when a value of the midamble indication subfield is a first value, the midamble indication subfield indicates that the data field of the PPDU comprises the midamble subfield, and the midamble periodicity indication subfield indicates the periodicity of the midamble.

4. The method according to claim 2, wherein:

when a value of the midamble indication subfield is a second value, the midamble indication subfield indicates that the data field of the PPDU does not comprise the midamble subfield, and the midamble periodicity indication subfield indicates a number of spatial streams, a number of extremely high throughput long training field (EHT-LTF) symbols, disregard, or validate.

5. The method according to claim 1, wherein the first data field further comprises a padding subfield, and a start location of the padding subfield is before the first OFDM symbol corresponding to the midamble subfield.

6. The method according to claim 1, wherein the first information subfield is an aggregate medium access control protocol data unit pre-end-of-frame padding (A-MPDU EOF padding) subfield.

7. A method, comprising:

receiving a physical layer protocol data unit (PPDU), wherein the PPDU comprises a data field, the data field comprises a first information subfield and a midamble subfield, the first information subfield is located before a first OFDM symbol corresponding to the midamble subfield, and the first information subfield comprises first data information; and parsing the PPDU to obtain the first data information, comprising:

when it is identified that a value of a midamble indication subfield in a universal signal field (U-SIG) is a first value, ignoring the midamble indication subfield, and obtaining and parsing the first information subfield to obtain the first data information; or when it is identified that a value of a midamble indication subfield in the U-SIG is the first value, determining that the data field comprises the midamble subfield, obtaining a periodicity of a midamble based on a midamble periodicity indication subfield, obtaining, based on the periodicity of the midamble, the first information subfield that is located before the first OFDM symbol corresponding to the midamble subfield, and obtaining and parsing the first information subfield to obtain the first data information.

8. The method according to claim 7, wherein the method is applied to a first-type station, and parsing the PPDU to obtain the first data information comprises:

when it is identified that the value of the midamble indication subfield in the U-SIG is the first value, ignoring the midamble indication subfield; and obtaining and parsing the first information subfield to obtain the first data information.

9. The method according to claim 7, wherein the method is applied to a second-type station, and parsing the PPDU to obtain the first data information comprises:

when it is identified that the value of the midamble indication subfield in the U-SIG is the first value, determining that the data field comprises the midamble subfield;

obtaining the periodicity of a midamble based on the midamble periodicity indication subfield;

obtaining, based on the periodicity of the midamble, the first information subfield that is located before the first OFDM symbol corresponding to the midamble subfield; and obtaining and parsing the first information subfield to obtain the first data information.

10. The method according to claim 7, wherein the data field further comprises a padding subfield, and a start location of the padding subfield is before a first midamble subfield.

11. The method according to claim 7, wherein the first information subfield is an aggregate medium access control protocol data unit pre-end-of-frame padding (A-MPDU EOF padding) subfield.

12. An apparatus, comprising:

at least one processor, wherein the at least one processor is coupled to a memory, the memory stores computer instructions, and the at least one processor executes the computer instructions, to enable the apparatus to perform the following operations:

generating a physical layer protocol data unit (PPDU) comprising a data field, wherein the data field comprises a first data field and a second data field; and sending the PPDU to a first station and a second station, wherein the first station does not support receiving a midamble, and the second station supports receiving the midamble, and wherein:

the second data field is transmitted on a second resource unit allocated to the second station, the second data field comprises a midamble subfield, the first data field is transmitted on a first resource unit allocated to the first station, the first data field comprises a first information subfield, the first information subfield comprises first data information, and the first information subfield is located before a first orthogonal frequency-division multiplexing (OFDM) symbol that corresponds to the midamble subfield; and wherein the PPDU further comprises a universal signal field (U-SIG), the U-SIG comprises a midamble indication subfield, and the midamble indication subfield indicates that the data field of the PPDU comprises the midamble subfield.

13. The apparatus according to claim 12, wherein the PPDU further comprises an extremely high throughput signal field (EHT-SIG), the U-SIG or the EHT-SIG comprises a midamble periodicity indication subfield, and the midamble periodicity indication subfield indicates a periodicity of the midamble.

14. The apparatus according to claim 13, wherein:

when a value of the midamble indication subfield is a first value, the midamble indication subfield indicates that the data field of the PPDU comprises the midamble subfield, and the midamble periodicity indication subfield indicates the periodicity of the midamble.

15. The apparatus according to claim 13, wherein:

when a value of the midamble indication subfield is a second value, the midamble indication subfield indicates that the data field of the PPDU does not comprise the midamble subfield, and the midamble periodicity indication subfield indicates a number of spatial streams, a number of extremely high throughput long training field (EHT-LTF) symbols, disregard, or validate.

16. The apparatus according to claim 12, wherein the first data field further comprises a padding subfield, and a start location of the padding subfield is before the first OFDM symbol corresponding to the midamble subfield.

17. The apparatus according to claim 12, wherein the first information subfield is an aggregate medium access control protocol data unit pre-end-of-frame padding (A-MPDU EOF padding) subfield.

* * * * *